US008929394B2

(12) United States Patent
Nag

(10) Patent No.: US 8,929,394 B2
(45) Date of Patent: Jan. 6, 2015

(54) END-TO-END SERVICE QUALITY FOR LATENCY-INTENSIVE INTERNET PROTOCOL (IP) APPLICATIONS IN A HETEROGENEOUS, MULTI-VENDOR ENVIRONMENT

(71) Applicant: Prom KS Mgmt Limited Liability Company, Wilmington, DE (US)

(72) Inventor: Siddhartha Nag, Holmdel, NJ (US)

(73) Assignee: Prom KS Mgmt Limited Liability Company, Wilmington, DE (US)

( * ) Notice: Subject to any disclaimer, the term of this patent is extended or adjusted under 35 U.S.C. 154(b) by 156 days.

(21) Appl. No.: 13/632,266

(22) Filed: Oct. 1, 2012

(65) Prior Publication Data

US 2013/0028268 A1 Jan. 31, 2013

Related U.S. Application Data

(63) Continuation of application No. 12/538,677, filed on Aug. 10, 2009, now Pat. No. 8,315,275, which is a
(Continued)

(51) Int. Cl.
*H04J 3/16* (2006.01)
*H04L 12/28* (2006.01)
(Continued)

(52) U.S. Cl.
CPC ........ *H04L 65/1043* (2013.01); *H04L 12/5695* (2013.01); *H04L 29/06027* (2013.01);
(Continued)

(58) Field of Classification Search
CPC ............................... H04L 47/70; H04J 3/1682
USPC .................... 370/468, 341, 401, 232
See application file for complete search history.

(56) References Cited

U.S. PATENT DOCUMENTS 5,394,522 A 2/1995 Sanchez-Frank et al.
5,640,595 A 6/1997 Baugher et al.
(Continued)

FOREIGN PATENT DOCUMENTS

EP 0632673 1/1995
EP 1017200 7/2000
(Continued)

OTHER PUBLICATIONS

Aggarwal, Alok et al., "Efficient Routing in Optical Networks", Journal of the ACM. vol. 43, Issue 6. ACM Press. Nov. 1996., 973-1001.

(Continued)

*Primary Examiner* — Afshawn Towfighi
(74) *Attorney, Agent, or Firm* — Brundidge & Stanger, P.C.

(57) ABSTRACT

Apparatus and methods are provided for delivering end-to-end Quality of Service (QoS) over Internet Protocol (IP) networks. According to one embodiment, a portion of available bandwidth between a first and second network device is reserved as a Quality of Service (QoS) resource pool for real-time communication sessions among users of a first and second user community. The first network device is communicatively coupled with a packet network and associated with the first user community. The second network device is communicatively coupled with the packet network and associated with the second user community. End-to-end application QoS is provided between the first and second user communities by selectively admitting real-time communication sessions between the first user community and the second user community based upon currently available resources associated with the QoS resource pool and multiplexing the real-time communication sessions over a reservation protocol session between the first and second network devices.

17 Claims, 18 Drawing Sheets

Related U.S. Application Data continuation of application No. 10/701,017, filed on Nov. 3, 2003, now Pat. No. 7,788,354, said application No. 12/538,677 is a continuation-in-part of application No. 10/206,402, filed on Jul. 27, 2002, now Pat. No. 7,266,683, said application No. 12/538,677 is a continuation-in-part of application No. 09/634,035, filed on Aug. 8, 2000, now Pat. No. 7,013,338, application No. 13/632,266, which is a continuation of application No. 11/267,922, filed on Nov. 4, 2005, now Pat. No. 8,458,332, which is a continuation of application No. 09/634,035, filed on Aug. 8, 2000, now Pat. No. 7,013,338.

(60) Provisional application No. 60/423,189, filed on Nov. 1, 2002, provisional application No. 60/308,421, filed on Jul. 27, 2001, provisional application No. 60/221,571, filed on Jul. 28, 2000.

(51) Int. Cl.
*H04L 29/06* (2006.01)
*H04L 12/54* (2013.01)
*H04L 12/801* (2013.01)
*H04L 12/853* (2013.01)
*H04L 12/833* (2013.01)
*H04L 12/891* (2013.01)
*H04L 12/913* (2013.01)
*H04L 12/927* (2013.01)
*H04L 12/911* (2013.01)

(52) U.S. Cl.
CPC ............ *H04L 47/18* (2013.01); *H04L 47/2416* (2013.01); *H04L 47/31* (2013.01); *H04L 47/41* (2013.01); *H04L 47/724* (2013.01); *H04L 47/801* (2013.01); *H04L 47/822* (2013.01); *H04L 47/825* (2013.01); *H04L 47/828* (2013.01); *H04L 63/0428* (2013.01); *H04L 65/1009* (2013.01); *H04L 65/1069* (2013.01); *H04L 65/608* (2013.01); *H04L 65/80* (2013.01); *H04L 63/0485* (2013.01); *H04L 63/105* (2013.01); *Y02B 60/33* (2013.01)
USPC ...................... 370/468; 370/395.41

(56) References Cited

U.S. PATENT DOCUMENTS

| | | | |
|---|---|---|---|
| 5,809,282 A | 9/1998 | Cooper et al. | |
| 5,826,242 A | 10/1998 | Montulli | |
| 5,831,975 A | 11/1998 | Chen et al. | |
| 5,884,037 A | 3/1999 | Aras et al. | |
| 5,903,735 A | 5/1999 | Kidder et al. | |
| 5,953,338 A * | 9/1999 | Ma et al. ................ | 370/395.21 |
| 5,958,009 A | 9/1999 | Friedrich et al. | |
| 5,996,013 A | 11/1999 | Delp et al. | |
| 6,009,469 A | 12/1999 | Mattaway et al. | |
| 6,026,443 A | 2/2000 | Oskouy et al. | |
| 6,041,353 A | 3/2000 | Hirata et al. | |
| 6,041,359 A | 3/2000 | Birdwell | |
| 6,046,981 A | 4/2000 | Ramamurthy et al. | |
| 6,054,987 A | 4/2000 | Richardson | |
| 6,061,723 A | 5/2000 | Walker et al. | |
| 6,092,113 A | 7/2000 | Maeshima et al. | |
| 6,104,721 A | 8/2000 | Hsu | |
| 6,108,310 A | 8/2000 | Wilkinson et al. | |
| 6,115,372 A | 9/2000 | Dinha | |
| 6,125,397 A | 9/2000 | Yoshimura et al. | |
| 6,154,465 A | 11/2000 | Pickett | |
| 6,208,638 B1 | 3/2001 | Rieley et al. | |
| 6,209,033 B1 | 3/2001 | Datta et al. | |
| 6,212,562 B1 | 4/2001 | Huang | |
| 6,226,678 B1 | 5/2001 | Mattaway et al. | |
| 6,243,376 B1 | 6/2001 | Ng et al. | |
| 6,243,759 B1 | 6/2001 | Boden et al. | |
| 6,259,771 B1 | 7/2001 | Kredo et al. | |
| 6,298,120 B1 | 10/2001 | Civanlar et al. | |
| 6,301,229 B1 | 10/2001 | Araujo et al. | |
| 6,366,577 B1 | 4/2002 | Donovan | |
| 6,370,154 B1 | 4/2002 | Wickham | |
| 6,377,546 B1 | 4/2002 | Guerin et al. | |
| 6,381,635 B1 | 4/2002 | Hoyer et al. | |
| 6,412,000 B1 | 6/2002 | Riddle et al. | |
| 6,418,139 B1 | 7/2002 | Akhtar | |
| 6,442,268 B1 | 8/2002 | Klaghofer et al. | |
| 6,442,615 B1 | 8/2002 | Nordenstam et al. | |
| 6,463,089 B1 | 10/2002 | Chauncey et al. | |
| 6,477,572 B1 | 11/2002 | Elderton et al. | |
| 6,490,249 B1 | 12/2002 | Aboul-Magd et al. | |
| 6,493,348 B1 | 12/2002 | Gelman et al. | |
| 6,499,027 B1 | 12/2002 | Weinberger | |
| 6,515,966 B1 | 2/2003 | Bardalai et al. | |
| 6,519,254 B1 | 2/2003 | Chuah et al. | |
| 6,549,940 B1 | 4/2003 | Allen et al. | |
| 6,570,867 B1 | 5/2003 | Robinson et al. | |
| 6,594,265 B1 | 7/2003 | Etorre et al. | |
| 6,594,268 B1 | 7/2003 | Aukia et al. | |
| 6,594,279 B1 | 7/2003 | Nguyen et al. | |
| 6,606,668 B1 | 8/2003 | MeLampy et al. | |
| 6,611,516 B1 | 8/2003 | Pirkola et al. | |
| 6,639,981 B1 | 10/2003 | Dunn, Jr. et al. | |
| 6,640,248 B1 | 10/2003 | Jorgensen | |
| 6,643,258 B1 | 11/2003 | Ise et al. | |
| 6,647,208 B1 | 11/2003 | Kirby | |
| 6,654,803 B1 | 11/2003 | Rochford et al. | |
| 6,667,968 B1 | 12/2003 | Tran | |
| 6,675,387 B1 | 1/2004 | Boucher et al. | |
| 6,678,729 B1 | 1/2004 | Ahoor et al. | |
| 6,680,943 B1 | 1/2004 | Gibson et al. | |
| 6,690,678 B1 | 2/2004 | Basso et al. | |
| 6,714,987 B1 | 3/2004 | Amin et al. | |
| 6,728,365 B1 | 4/2004 | Li et al. | |
| 6,738,383 B1 | 5/2004 | Kliland et al. | |
| 6,744,767 B1 | 6/2004 | Chiu et al. | |
| 6,751,677 B1 | 6/2004 | Ilnicki et al. | |
| 6,771,661 B1 | 8/2004 | Chawla et al. | |
| 6,775,701 B1 | 8/2004 | Pan et al. | |
| 6,798,786 B1 | 9/2004 | Lo et al. | |
| 6,804,224 B1 | 10/2004 | Schuster et al. | |
| 6,831,932 B1 | 12/2004 | Boyle et al. | |
| 6,870,845 B1 | 3/2005 | Bellovin et al. | |
| 6,904,017 B1 * | 6/2005 | Meempat et al. ............. | 370/238 |
| 6,904,110 B2 | 6/2005 | Trans et al. | |
| 6,909,708 B1 | 6/2005 | Krishnaswamy et al. | |
| 6,910,074 B1 | 6/2005 | Amin et al. | |
| 6,925,076 B1 | 8/2005 | Dalgic et al. | |
| 6,937,566 B1 | 8/2005 | Forsloew | |
| 6,940,814 B1 | 9/2005 | Hoffman | |
| 6,967,958 B2 | 11/2005 | Ono et al. | |
| 6,973,027 B1 | 12/2005 | Shaffer et al. | |
| 6,977,896 B1 | 12/2005 | Kobayashi | |
| 6,985,957 B2 | 1/2006 | Fujita | |
| 7,002,993 B1 | 2/2006 | Mohaban et al. | |
| 7,013,338 B1 | 3/2006 | Nag et al. | |
| 7,016,375 B1 | 3/2006 | Rosenberg et al. | |
| 7,039,175 B1 | 5/2006 | Foltak et al. | |
| 7,051,070 B2 | 5/2006 | Tuttle et al. | |
| 7,072,295 B1 | 7/2006 | Benson et al. | |
| 7,075,915 B1 | 7/2006 | Gustke | |
| 7,124,187 B1 | 10/2006 | Kodialam et al. | |
| 7,136,377 B1 | 11/2006 | Tweedly et al. | |
| 7,143,152 B1 | 11/2006 | Elman et al. | |
| 7,209,473 B1 | 4/2007 | Mohaban et al. | |
| 7,221,384 B2 | 5/2007 | Mueller et al. | |
| 7,221,662 B2 | 5/2007 | Koistinen | |
| 7,266,683 B1 | 9/2007 | Nag | |
| 7,266,832 B2 | 9/2007 | Miller | |
| 7,269,657 B1 | 9/2007 | Alexander et al. | |
| 7,274,662 B1 | 9/2007 | Kalmanek, Jr. et al. | |
| 7,280,528 B1 | 10/2007 | Polit et al. | |
| 7,305,000 B2 | 12/2007 | Horiba | |

(56) References Cited

U.S. PATENT DOCUMENTS

| | | | |
|---|---|---|---|
| 7,480,305 | B1 | 1/2009 | Somasundaram |
| 7,606,146 | B1 | 10/2009 | Pan et al. |
| 7,693,062 | B2 | 4/2010 | Perkins et al. |
| 7,774,468 | B1 | 8/2010 | Nag et al. |
| 7,924,849 | B2 | 4/2011 | Gallant et al. |
| 2001/0016914 | A1* | 8/2001 | Tabata .......................... 713/201 |
| 2002/0015387 | A1 | 2/2002 | Houh |
| 2002/0030696 | A1 | 3/2002 | Twinkwalder et al. |
| 2002/0049841 | A1 | 4/2002 | Johnson et al. |
| 2002/0049860 | A1 | 4/2002 | Koistinen |
| 2002/0120741 | A1 | 8/2002 | Webb et al. |
| 2002/0152305 | A1 | 10/2002 | Jackson et al. |
| 2002/0174227 | A1 | 11/2002 | Hartsell et al. |
| 2002/0188720 | A1 | 12/2002 | Terrell et al. |
| 2002/0199012 | A1 | 12/2002 | Cable et al. |
| 2003/0026423 | A1 | 2/2003 | Unger et al. |
| 2003/0028535 | A1 | 2/2003 | Sheldon et al. |
| 2003/0046396 | A1 | 3/2003 | Richter et al. |
| 2003/0053463 | A1 | 3/2003 | Vikberg et al. |
| 2003/0091049 | A1 | 5/2003 | Abe et al. |
| 2003/0126287 | A1 | 7/2003 | Charny et al. |
| 2003/0219029 | A1 | 11/2003 | Pickett |
| 2004/0039820 | A1 | 2/2004 | Colby et al. |
| 2004/0057435 | A1 | 3/2004 | Ruyle et al. |
| 2004/0073641 | A1 | 4/2004 | Minhazuddin et al. |
| 2004/0172464 | A1 | 9/2004 | Nag |
| 2004/0205239 | A1 | 10/2004 | Doshi et al. |
| 2005/0018652 | A1 | 1/2005 | Crouch et al. |
| 2005/0044161 | A1 | 2/2005 | Fujita |
| 2005/0083842 | A1 | 4/2005 | Yang et al. |
| 2005/0128951 | A1 | 6/2005 | Chawla et al. |
| 2005/0138204 | A1 | 6/2005 | Iyer et al. |
| 2005/0198261 | A1 | 9/2005 | Durvasula et al. |
| 2005/0210292 | A1 | 9/2005 | Adams et al. |
| 2006/0020694 | A1 | 1/2006 | Nag et al. |
| 2006/0056298 | A1 | 3/2006 | Nag et al. |
| 2007/0168517 | A1 | 7/2007 | Weller et al. |
| 2009/0296734 | A1 | 12/2009 | Nag |

FOREIGN PATENT DOCUMENTS

| | | | |
|---|---|---|---|
| JP | 7105103 | | 4/1995 |
| WO | 0077988 | | 12/2000 |
| WO | 0105115 | A2 | 1/2001 |
| WO | 0131939 | | 5/2001 |
| WO | 0213023 | | 2/2002 |
| WO | 0217036 | | 2/2002 |

OTHER PUBLICATIONS

Allen, P., Putting new service management tactics to work, Service providers can make smarter use of service management technology, ServerWorld, vol. 16, No. 4, Apr. 2002 (3 pages).

Almesberger, et al., "Scalable Resource Reservation for the Internet" IEEE, 1997, 10 pages.

Baker, L et al., "Aggregation of RSVP for IPv4 and IPv6 Reservations", Retrieved from: http://www.ietf.org/rfc/rfc3175.txt?number=3175> on Sep. 2001, 34 pages.

Blake, et al., "An Architecture for Differentiated Services", Retrieved from http://www.ietf.org/rfc/rfc2475.txt, The Internet Society, 1998,34 pages.

Blefari-Melazzi, N. et al., "Charging IP Network Services in a DiffServ Environment", Proceedings of Advanced Internet Charging and QoS Technology 2001 (ICQT'01) Workshop, Vienna, Austria, Sep. 2001,(Aug. 2001), 11 pages.

Braden et al., "RFC 2205—Resource ReSerVation Protocol (RSVP)—Version 1 Functional Specification", [on-line], [retrieved Nov. 21, 2003]. Retrieved from the Internet <URL: http://www.faqs.org/rfcs/rfc2205.html>.

Braden R. RFC 2205. Network Working Group, 1997. 150 Pages.

Braden, R et al., "RFC2205 Resource ReSerVation Protocol (RSVP) Version 1 Functional Specification", Printed from Internet at: <http://www.faqs.org/rfcs/rfc2205.html> on Sep. 1997, 79 pages.

Cisco HP Smart Way 2004 Solution Brief, 2003, Cisco Systems and Hewlett-Packard (4 pages).

Delivers comprehensive service management for windows, UNIX and Linux systems and applications, NetIQ AppManager Suite, 2004, NetIQ Corporation (4 pages).

Delivers Enterprise VoIP QoS and Management, AppManager for VoIP, 2004, NetIQ Corporation (4 pages).

Delivers the leading software solution for assessing a data network's readiness for VoIP, Vivinet Assessor, 2004, NetIQ Corporation (2 pages).

Eder, M et al., "IP Service Management in the QoS Network", Retrieved from: <http://search.ietf.org/internet-drafts/draft-irtf-smrg-ipsmf-01- .txt> on Feb. 26, 2002, (Nov. 2001),15 pages.

Eder, M., et al., Service Management Architectures Issues and Review, Jan. 2001, printed from Internet at: ftp://ftp.isi.edu/in-notes/rfc3052.txt (12 pages).

Farrell, C., Grappling With Management of IP Telephony, Internet Telephony, May 2004, Technology Marketing Corporation (2 pages).

Gain strategic advantage with HP IT Service Management, White paper, 2003, Hewlett-Packard Development Company, L.P. (8 pages).

Greenstein, Larry "Transporting Voice Traffic Over Packet Networks", International Journal of Network Management, vol. 8, (1998), 227-234.

Handley, M., et al., SIP: Session Initiation Protocol, Mar. 1999, printed from Internet at: ftp://ftp.isi.edu/in-notes/rfc2543.txt (143 pages).

Harbaum, T et al., "Layer 4+Switching with QOS Support for RTP and HTTP", Global Telecommunication Conference, GLOBECOM '99,(1999), 6 pages.

Hewlett-Packard OpenView—about Hewlett-Packard OpenView, 2004, Hewlett-Packard Development Company, L.P., printed from the Internet at: http://www.managementsoftware.hp.com/cgi-bin/pf-new.cgi?IN=hp//about/inde- x.html (2 pages).

HP Open View, Network Node Manager Smart Plug-in for Advanced routing 1.0 Data sheet, 2003-2004, Hewlett-Packard Development Company, L.P. (4 pages).

HP Open View, Service Quality Manager 1.1 data sheet, 2003, Hewlett-Packard Development Company, L.P. (4 pages).

HP OpenView Network Services—Management—Business blueprint, 2004, Hewlett-Packard Development Company, L. P. (6 pages).

HP OpenView Performance Insight Pack for Infrastructure Usage, 2004, Hewlett-Packard Development Company, L.P. (6 pages).

HP OpenView Performance Insight Report Pack for IP Telephony 1.2, 2004, Hewlett-Packard Development Company, L.P. (8 pages).

HP OpenView, Customer Views 1.4 for Network Node Manager data sheet, 2003, Hewlett-Packard Development Company, L.P. (4 pages).

HP OpenView, glanceplus and glanceplus pak product brief, 2003, Hewlett-Packard Company (6 pages).

HP OpenView, Network Node Manager Smart Plug-in for Advance Routing 1.0 Data sheet, 2003-2004, Hewlett-Packard Development Company, L.P. (4 pages).

HP OpenView, Operations 7.x for Windows, Firewall Configuration white paper, 2002, Hewlett-Packard Company (60 pages).

HP OpenView, Performance Manager, Performance Monitor and Performance Agent data sheet, 2003, Hewlett-Packard Development Company, L.P. (4 pages).

HP OpenView, problem diagnosis 1.1 product brief, 2002, Hewlett-Packard Company (4 pages).

HP OpenView, service information portal 3.1 product brief, 2003, Hewlett-Packard Company (4 pages).

HP OpenView, service quality manager product overview, 2003, Hewlett-Packard Company (16 pages).

Hwang, Junseok "A Market Based Model for the Bandwidth Management of Intserv DiffServ QoS Interconnection A Network Economic Approach", 2000, 204 pages.

Intelligent Diagnostics for Networks, Beyond root-cause analysis, A white paper from HP—preliminary, 2003, Hewlett-Packard Development Company, L.P. (12 pages).

Jamalipour, et al., "Next Generation Broadband Wireless Networks and Navigation Services", Retrieved from http://www.comsoc.org/livepubs/ci1/Public/2002/Feb/gstedjamal.html, Guest Editorial, 2003, 4 pages.

(56) References Cited

OTHER PUBLICATIONS

Kankkunen, et al., "VoIP over MPLS Framework Internet Draft", Retrieved from Internet at http://tools.ietf.org/html/draft-kankkunen-vompls-fw-01, Internet Engineering Task Force, 2000, 58 pages.

Kankkunen, et al.; "VoIP over MPLS Framework Internet Draft"; Internet Engineering Task Force; 2000; retrieved from Internet: http://tools.ietf.org/html/draft-kankkunen-vompls-fw-01: 58 pages.

Kim, et al., "A Dynamic Admission Control Scheme in a DiffServ Domain", Workshop on High Performance Switching and Routing, 2002, 5 pages.

Lee, K. "Adaptive network support for mobile multimedia", 1st Annual International Conference on Mobile Computing and Networking, ISBN 0897919142,(1995),13 pages.

Management Software—Alliance with Cisco Systems, Inc., 2004, Hewlett-Packard Development Company, L.P., printed from the Internet at: http://www.openview.hp.com/cgi-bin/pf-new.cgi?IN=hp//partners/alliances/p- all.sub.-0001.html (2 pages).

Management Software—IP telephony management solutions overview & features, 2004, Hewlett-Packard Development Company, L.P., printed from the Internet at: http://www.openview.hp.com/cgi-bin/pf-new.cgi?IN=hp//products/nnm/prod.su- b.--nnm.sub.--0002.h . . . (1 page).

Maxemchuk, N "Applying packet techniques to cellular radio", Wireless Networks. vol. 5, Issue 6. Dec. 1999. Kluwer Academic Publishers.,(Dec. 1999),519-536.

Measures network performance and predicts the impact of changes, Chariot, 2004, NetIQ Corporation (2 pages).

Micromuse: Products & Solutions—Netcool Suite Overview, 2004, Micromuse, Inc., printed from the Internet at: http://www.micromuse.com/products.sub.--sols/index.html (9 pages).

Muller, Nathan "Improving and Managing Multimedia Performance over TCP/IP Nets", International Journal of Network Management, vol. 8,, (1998), 356-367.

Nag, et al., "U.S. Appl. No. 11/038,445 entitled Differentiated Services (DiffServ) traffic admission control", U.S. Appl. No. 11/038,445, filed Jan. 18, 2005, 34 pages.

Netcool/Monitors Product Family—Realtime and Trended Performance, Status and Service Monitoring, 2004, Micromuse, Inc. (4 pages).

Netcool/Precision for IP Networks: Discovery & Topology-/Based / RCA, Micromuse, Inc., (2 pages), 2002.

Netcool/System Service Monitors White Paper, Including Netcool/Applications Service Monitors, 2003, Micromuse, Inc. (8 pages).

Netcool/Usage Service Monitors White Paper (Netcool/USMs), 2003, Micromuse, Inc. (11 pages). GB2324627.

NetIQ: Appmanager for VoIP, 1993-2004, NetIQ Corporation, printed from the Internet at: http://www.netiq.com/products/am/modules/voip.asp?print=true (1 page).

NetIQ: VoIP Management Solution, 1993-2004, NetIQ Corporation, printed from the Internet at:: http//www.netiq.com/solutions/voip/default.asp?print=true (1 page).

NetIQ's VoIP Management Solution, 2004, NetIQ Corporation (2 pages).

Pearsall, S et al., "Doing a VoIP Assessment with Vivinet Assessor", NetIQ Work Smarter 2001-2002 NetIQ Corporation, 19 pages.

Pinpoints VoIP quality problems in minutes, Vivinet Diagnostics, 2004, NetIQ Corporation (2 pages).

Roaten, "IP Telephony and EIC a Technical Overview", Interactive Intelligence, 1998, 9 pages.

Siler, et al., "Measurement Based Admission Control and Monitoring for Statistical Rate Latency Guarantees", Proceedings of the 38th Conference on Decision & control, Phoenix, AZ, Dec. 1999, 6 pages.

SIP: Session Initiation Protocol, updated Aug. 2004, printed from Internet at: http://www.cs.columbia.edu/sip (1 page).

SIP: Session Initiation Protocol—Implementations, News, updated Aug. 2004, printed from Internet at: http://www.cs.columbia.edu/sip/news.html (4 pages).

Terzis, A. et al., "Reservations for aggregate traffic: experience from an RSVPtunnels implementation", 1998 Sixth 6th International Workshop on Quality of Service (IWQoS), ISBN 0780344820,(1998), 3 pages.

Terzis, A. et al., "RSVP Operation Over IP Tunnels", Request for Comments (RFC) 2746, (Jan. 2000),25 Pages.

Tewari, et al., "A New Call Admission Control Scheme for Real Time Traffic in Wireless Networks", Conference on Convergent Technologies for Asia-Pacific Region, vol. 4, Issue Oct. 15-17, 2003, Tencon 2003, (Oct. 2003),5 pages.

Zhu, C., et al., RFC 2190—RTP Payload Format for H.263 Video Streams, Sep. 1997, printed from Internet at: http://www.faqs.org/rfcs/rfc2190.html (10 pages).

"Administrivia Last Time Endpoint Admission Control Paper This Paper Explore Tradeoffs for This Type of Solution", Suny-Binghamton, Lecture #24, 2003, 8 pages.

"AdventNet Products", Retrieved from http://a1132.g.akamai.net/7/1132/1581/1382cd01af18b6/www.adventnet.com/pr- oducts.html on Sep. 13, 2000, AdventNet, 2 pages.

"Cisco IOS Software Release 12.0 T", Retrieved from http://www.cisco.com/enUS/products/sw/iosswrel/ps1830/products>on Dec. 11, 2003, 12 pages.

"Cisco Network Management", Retrieved from http://ww.cisco.com/warp/public/44/jump/network management.shtml on Sep. 13, 2000, 5 pages.

"Delivers comprehensive service management for windows UNIX and Linux systems and applications", NetIQ AppManager Suite 2004 NetIQ Corporation, 4 pages.

"Delivers Enterprise VoIP QoS and Management", AppManager for VoIP 2004 NetIQ Corporation, 4 pages.

"Delivers the leading software solution for assessing a data network's readiness for VoIP", Vivinet Assessor 2004 NetIQ Corporation, 2 pages.

"DiffServ the Scalable End-to-End QoS Model", Cisco Systems, 2001, 19 pages.

"Entities", Retrieved from http://ai3.asti.dost.gov.ph/h.323/entities.htm, 2003, 6 pages.

"European Search Report", Application No. EP03768594, (Mar. 24, 2006), 2 pages.

"Gain strategic advantage with HP IT Service Management", White paper, Hewlett-Packard Development Company LP,(2003), 8 pages.

"H.323 Primer an Introduction to H.323", Retrieved from http://voip-calculator.com/h323primer.html, 2003, 5 pages.

"Hewlett-Packard OpenView about Hewlett-Packard OpenView", Printed from the Internet at http://www.managementsoftware.hp.com/cgi-bin/pf-new.cgi?IN=hp//about/inde- x.html, Hewlett-Packard Development Company LP,(2004), 2 pages.

"HP Open View", Service Quality Manger 1.1 data sheet, Hewlett-Packard Development Company LP,(2003), 4 pages.

"HP OpenView glanceplus and glanceplus pak product brief"; Hewlett-Packard Invent; Feb. 2003; 6 pages.

"HP OpenView Network Services Management Business blueprint", 2004, Hewlett-Packard Development Company LP, 6 pages.

"HP OpenView Operations 7.x for Windows", Firewall Configuration white paper, Hewlett-Packard Company,(2002), 60 pages.

"HP OpenView Performance Insight Pack for Infrastructure Usage", 2004, Hewlett-Packard Company LP, (2004), 6 pages.

"HP OpenView Performance Insight Report Pack for IP Telephony 1.2", 2004, Hewlett-Packard Development Company LP, (2004), 8 pages.

"HP OpenView Performance Manager", Performance Monitor and Performance Agent data sheet, Hewlett-Packard Development Company LP,(2003), 4 pages.

"HP OpenView", Customer Views 1.4 for Network Node Manager data sheet, Hewlett-Packard Development Company LP,(2003), 4 pages.

"HP OpenView", glanceplus and glanceplus pak product brief, Hewlett-Packard Company,(2003), 6 pages.

"HP OpenView", Network Node Manager Smart Plug-in for Advance Routing 1.0 Data sheet, 2003-2004 Hewlett-Packard Development Company LP, 4 pages.

"HP OpenView", problem diagnosis 1.1 product brief, Hewlett-Packard Company,(2002), 4 pages.

(56) References Cited

OTHER PUBLICATIONS

"HP OpenView", service information portal 3.1 product brief, Hewlett-Packard Company,(2003), 4 pages.
"HP OpenView", service quality manager product overview, Hewlett-Packard Company,(2003), 16 pages.
"HPSR 2002 Technical Program", Retrieved from http://www.ieice.org/hpsr2002/detail.html, 2003, 8 pages.
"HPSR 2002 Technical Program", Retrieved from http://www.ieice.org/hpsr2002/detail.html, 2003,8 pages.
"Intelligent Diagnostics for Networks Beyond root cause analysis", A white paper from HP preliminary, Hewlett-Packard Development Company LP, (2003), 12 pages.
"International Search Report", International Application No. PCT/US2001/024878, (Dec. 19, 2001), 3 pages.
"International Search Report", International Application No. PCT/US2003/035024, (May 28, 2004), 4 pages
"International Search Report", International Application No. PCT/US2006/016094, (Aug. 22, 2007), 3 pages.
"Management Software Alliance with Cisco Systems Inc", Printed from the Internet at http://www.openview.hp.com/cgi-bin/pf-new.cgi?IN=hp//partners/alliance/pa- II.sub.-0001.html, Hewlett-Packard Development Company LP,(2004), 2 pages.
"Management Software IP telephony management solutions overview & features", Printed from the Internet at http://www.openview.hp.com/cgi-gin/pf-new.cgi?IN=hp//partners/nnm/prod.su- b.-nnm.sub.--0002.h . . . , Hewlett-Packard Development Company LP,(2004), 1 page.
"Measures network performance and predicts the impact of changes Chariot", 2004 NetIQ Corporation, 2 pages.
"MeraVoice over IP Solutions", Retrieved from http://www.mera-voip.com/support/glossary.php, VOIP Technology and Product: VoIP Glossary, 2003, 6 pages.
"Micromuse Products & Solutions Netcool Suite Overview", Printed from the Internet at http://www.micromuse.com/products.sub.--sols/index.html, Micromuse Inc,(2004),9 pages.
"Netcool Monitors Product Family Realtime and Trended Performance", Status and Service Monitoring, Micromuse Inc, (2004), 4 pages.
"Netcool Precision for IP Networks Discovery & Topology Based RCA", Micromuse Inc., 2002, 2 pages.
"Netcool System Service Monitors White Paper", Including Netcool Application Service Monitors, Micromuse Inc, (2003), 8 pages.
"Netcool Usage Service Monitors White Paper (Netcool/USMs)", 2003 Micromuse Inc, (2003), 11 pages.
"Netcool/Precision for IP Networks: Discovery & Topology-Based RCA," Micromuse, Inc., 2 pages, 2002.
"NetIQ Appmanager for VoIP", 1993-2004 NetIQ Corporation, Printed from the Internet at http://www.netiq.com/products/am/modules/voip.asp?print=true, 1 page.
"NetIQ Chariot", Printed from Internet at http://www.netiq.com/products/chr/default.asp?print=true, 1993-2004 NetIQ Corporation,1 page.
"NetIQ Vivinet Diagnostics", Printed from the Internet at http://www.netiq.com/products/vd/default.asp?print=true, 1993-2004 NetIQ Corporation, 1 page.
"NetIQ VoIP Management Solution" Printed from the Internet at http://www.netiq.com/solutions/voip/default.asp?print=true, 1993-2004 NetIQ Corporation, 1 page.

\* cited by examiner

END-TO-END SERVICE QUALITY FOR LATENCY-INTENSIVE INTERNET PROTOCOL (IP) APPLICATIONS IN A HETEROGENEOUS, MULTI-VENDOR ENVIRONMENT

This application is a continuation of U.S. patent application Ser. No. 12/538,677, filed Aug. 10, 2009, which is a continuation of U.S. patent application Ser. No. 10/701,017, filed Nov. 3, 2003, now U.S. Pat. No. 7,788,354, which claims priority from U.S. Provisional Application No. 60/423,189, filed Nov. 1, 2002, all of which are hereby incorporated by reference in its entirety. U.S. patent application Ser. No. 12/538,677, filed Aug. 10, 2009, is a continuation-in-part of U.S. patent application Ser. No. 10/206,402, filed Jul. 27, 2002, now U.S. Pat. No. 7,266,683, which claims priority from U.S. Provisional Application 60/308,421, filed Jul. 27, 2001, all of which are hereby incorporated by reference in its entirety. U.S. patent application Ser. No. 12/538,677, filed Aug. 10, 2009, is a continuation-in-part of U.S. patent application Ser. No. 09/634,035, filed Aug. 8, 2000, now U.S. Pat. No. 7,013,338, which claims priority from U.S. Provisional Application 60/221,571, filed Jul. 28, 2000, all of which are hereby incorporated by reference in its entirety. This application is a continuation of U.S. patent application Ser. No. 11/267,922, filed Nov. 4, 2005, which is a continuation of U.S. patent application Ser. No. 09/634,035, filed on Aug. 8, 2000, now U.S. Pat. No. 7,013,338, which claims priority from U.S. Provisional Application 60/221,571, filed Jul. 28, 2000, all of which are hereby incorporated by reference in its entirety.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention generally relate to the delivery of true end-to-end application Quality of Service (QoS) over Internet Protocol (IP) networks. More particularly, embodiments of the present invention relate to techniques for pre-allocating an aggregated end-to-end network reservation protocol session between heterogeneous, multi-vendor environments and thereafter sharing the reservation protocol session among multiple individual application sessions, such as voice, video, and real-time media applications, by multiplexing the multiple individual application flows running across the end-to-end network thereon to achieve desired QoS needs.

2. Description of the Related Art

The consolidation and transfer of voice and voice-band data (e.g., fax and analog modems) with data services over public packet networks, such as the Internet, is rapidly gaining acceptance. However, significant work remains to support the high-availability and tight quality of service (QoS) requirements needed to support voice, video, and real-time content applications over IP networks.

A variety of IP QoS mechanisms are currently available. Some of the more prevalent examples include IP router techniques such as localized queuing and prioritized packet classifications as well as standardized networking protocols such as Resource Reservation Protocol (RSVP), Differentiated Services (Diffserv), and Multiprotocol Label Switching (MPLS). While these solutions have been heavily marketed as QoS solutions, they have met with poor customer acceptance because they represent, at best, only partial solutions for IP QoS. Even when used in conjunction with one another, there are several major deficiencies with the current approaches.

First, they are static in nature and non-adaptive to real-time network load and delay conditions which have critical effects on application performance such as voice. Additionally, since these solutions typically require a manual and predetermined traffic engineering process to identify optimal network routing and bandwidth, once the design is implemented in the network there is no ability to make intelligent routing and control decisions to compensate for dynamic network behavior.

Second, today's solutions are transport-centric with no awareness of the individual application flows running across the end-to-end network. Thus, since no distinction can be made between packets, such as a voice packet and an ordinary data packet, for example, there is once again no ability to make intelligent routing and control decisions to ensure end-to-end application QoS.

Finally, there are a variety of other deficiencies depending on the mechanism being used. These include "per-router-hop behaviors" with no tightly-coupled, end-to-end QoS integration, high complexity and overhead; and extensive requirements for ongoing traffic engineering and network design as mentioned above.

In summary, today's IP QoS mechanisms and protocols provide a part of the solution to the problem, but have proven to be unworkable in real-world, voice, video and data IP networks.

SUMMARY

Apparatus and methods are described for delivering end-to-end application Quality of Service (QoS) over Internet Protocol (IP) networks. According to one embodiment, According to one embodiment, a portion of available bandwidth between a first and second network device is reserved as a Quality of Service (QoS) resource pool for real-time communication sessions among users of a first and second user community. The first network device is communicatively coupled with a packet network and associated with the first user community. The second network device is communicatively coupled with the packet network and associated with the second user community. End-to-end application QoS is provided between the first and second user communities by selectively admitting real-time communication sessions between the first user community and the second user community based upon currently available resources associated with the QoS resource pool and multiplexing the real-time communication sessions over a reservation protocol session between the first and second network devices.

Other features of embodiments of the present invention will be apparent from the accompanying drawings and from the detailed description that follows.

BRIEF DESCRIPTION OF THE SEVERAL VIEWS OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1A:
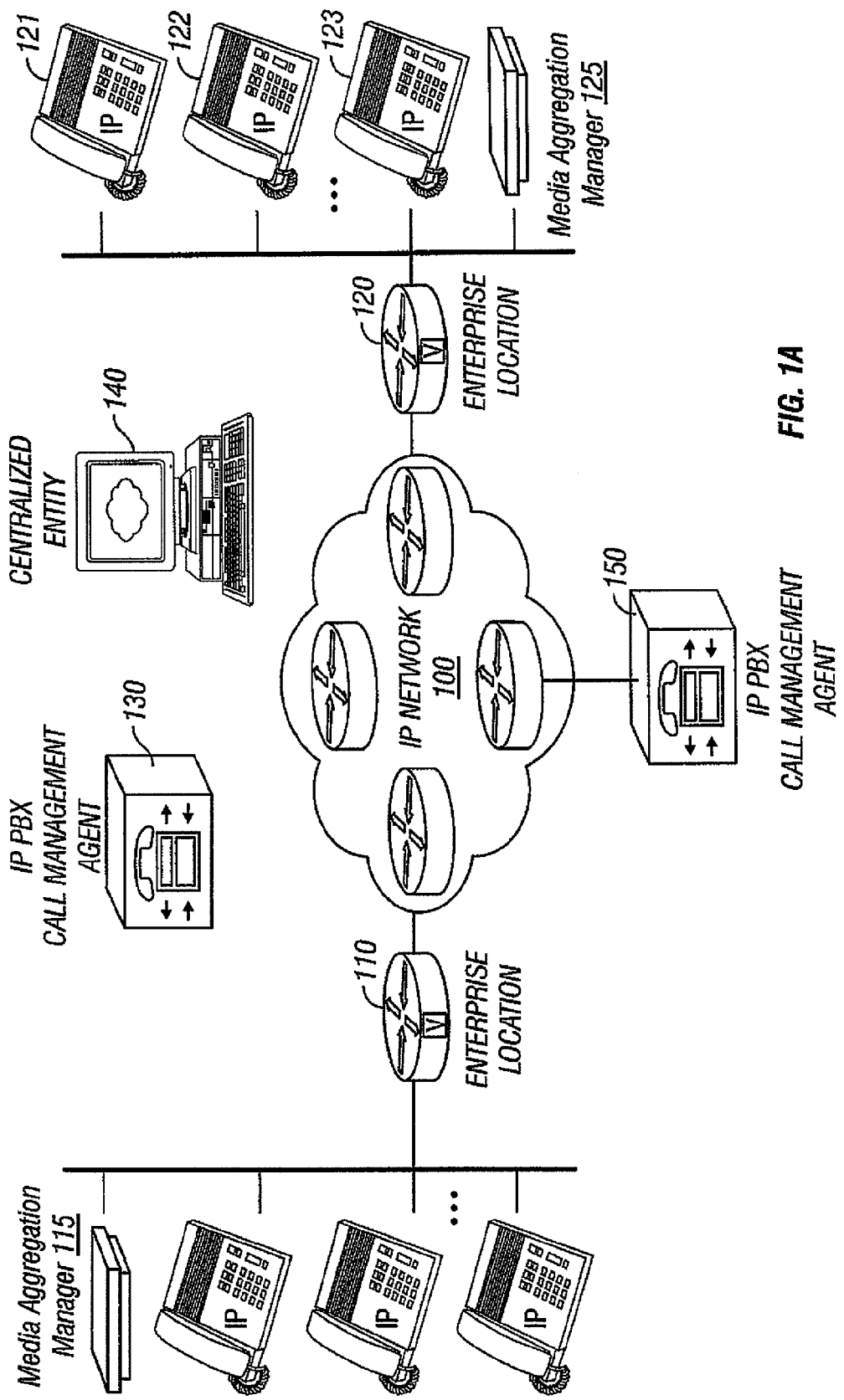
FIG. 1A illustrates a simplified logical architecture of an enterprise VoIP network according to one embodiment of the present invention.

Apparatus and methods are described for providing end-to-end application quality of service (QoS) over IP networks. Embodiments of the present invention seek to provide a scalable and flexible architecture that enables efficient provisioning of reserved bandwidth to multiple application flows running across the end-to-end network by multiplexing the individual application flows over a pre-allocated reservation protocol session thereby providing true end-to-end QoS support. The pre-allocated reservation protocol session may take into consideration current network resources and estimated usage of network resources, such as bandwidth, based upon historical data. For example, the amount of pre-allocated resources may vary due to different loads being offered at different times of day and/or day of week. Additionally, the pre-allocated reservation protocol session may be dynamically adjusted to account for actual usage that surpasses the estimated usage or actual usage that falls below the estimated usage.

According to one embodiment, a more intelligent approach is employed in connection with initiation and maintenance of a large number of reservations. Rather than establishing and maintaining a reservation protocol session for each application flow that requires real-time response, which results in many independent reservation protocol sessions and high overhead, a single reservation protocol session may be pre-allocated and subsequently dynamically shared among the application flows by aggregating the associated media packets and transmitting them as a multiplexed media stream over the end-to-end IP virtual connection QoS pipe. As a result, in this embodiment, a single, dynamic end-to-end QoS pipe may be maintained between two different user communities using a pre-allocated RSVP session between a pair of media aggregation managers. The media aggregation managers multiplex (and optionally selectively encrypt) outbound voice packets onto the pre-allocated RSVP session (and decrypt) and demultiplex inbound voice packet received over the pre-allocated RSVP session, thereby sharing a common RSVP session and reducing the computational resources required by the network to provide real-time response for multiple application flows. Advantageously, in this manner, application-level intelligence, dynamic traffic engineering, and IP route control capabilities are extended to existing IP QoS protocols thereby making it feasible to use reservation protocols, such as RSVP, for large numbers of applications that require real-time performance and QoS, such as VoIP services.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware and software.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to particular existing signaling, control, and communications protocol standards, such as International Telecommunication Union Telecommunication Standardization Section (ITU-T) Recommendation H.225.0 entitled "Call Signalling Protocols and Media Stream Packetization for Packet-based Multimedia Communication Systems," published February 1998 (hereinafter H.225.0); ITU-T Recommendation H.245 entitled "Control Protocol for Multimedia Communication," published May 1999 (hereinafter H.245); ITU-T Recommendation H.323 entitled "Packet-based Multimedia Communications Systems," published September 1999 (hereinafter H.323); and a particular bandwidth reservation protocol (i.e., RSVP), the present invention is equally applicable to various other signaling, control, communications and reservation protocols. For example, Session Initiation Protocol (SIP) may be employed to create, modify, and terminate application sessions with one or more participants. SIP is described in M. Handley et al., "SIP: Session Initiation Protocol," REC 2543, Network Working Group, March 1999, which is hereby incorporated by reference. Furthermore, it is contemplated that embodiments of the present invention will be applicable to various proprietary signaling and media transport protocols such as those employed between and among IP Private Branch Exchange (PBX) systems and IP phones of various vendors.

In addition, for sake of brevity, embodiments of the present invention are described with reference to a specific application (i.e., VoIP) in which individual flows may be multiplexed over a pre-allocated bandwidth reservation protocol session. Nevertheless, embodiments of the present invention are equally applicable to various other network applications or services that are latency intensive (e.g., affected by jitter and/or transmission delays) and/or that require real-time performance, such as applications based on human interactions (e.g., collaborative software, online/Web collaboration, voice conferencing, and video conferencing), and real-time data communication and/or exchange, such as market data applications, financial transactions, and the like.

Terminology

Brief definitions of terms used throughout this application are given below.

A "media aggregation manager" may generally be thought of as a network device, such as an edge device at the ingress/egress edges of a user community or enterprise site or a group of one or more software processes running on one or more servers that provides application/protocol specific multiplexing/demultiplexing of media traffic through a pre-allocated reservation protocol session also referred to as an IP virtual connection (VC) QoS pipe. In various embodiments, the media aggregation manager may include more or less functionality depending upon the target usage environment. For example, in one embodiment, the media aggregation manager implements signaling protocol functionality to communicate with IP phone sets, terminals, and/or other IP telephony products. In another embodiment, in which the media aggregation manger is intended to cooperate with an IP PBX system, the media aggregation manager acts as a signaling and/or media gateway and an H.323 gatekeeper.

A "reservation protocol" generally refers to a protocol that may be employed to communicate information regarding a desired level of service for a particular application flow. An example of an existing bandwidth reservation protocol is RSVP.

A "user community" generally refers to a group of users residing on a common network at a given location. For example, employees on an enterprise network at a given location, users of a particular Internet service provider (ISP) at a given location, subscribers to a particular long distance carrier in a given region, or other users accessing a distributed IP network via a common access point may represent a user community.

A "reservation protocol session" generally refers to a set of reserved network resources established and maintained between two or more network devices that serve as proxies for application endpoints residing behind the proxies. An example of a reservation protocol session is an RSVP session between two media aggregation managers.

An "application session" generally refers to a session established and maintained between two or more terminals. According to embodiments of the present invention, one or more application sessions may be multiplexed onto a single reservation protocol session thereby reducing the overhead for establishing and maintaining multiple reservation protocol sessions.

A "terminal" generally refers to a LAN-based endpoint for media transmission, such as voice and/or voice-based data transmission. Terminals may be capable of executing one or more networked applications programs. Examples of terminals include IP phones and computer systems running an Internet telephony application, such as CoolTalk or NetMeeting.

A "tunnel" generally refers to a logical transmission medium through which packets of one protocol encapsulated or wrapped in a packet of another protocol are transmitted via the protocol of the wrapper. According to one embodiment, voice and/or voice-band data packets are encrypted proximate to the source for secure transmission over one or more public internetworks, such as the Internet, and then decrypted proximate to the destination.

An "application" or "endpoint" generally refers to a software program that is designed to assist in the performance of a specific task, such as Internet telephony, online collaboration, video conferencing, or exchange of mission critical data.

An "application flow" generally refers to the data associated with an application session. An example of an application flow is a media stream, such as a continuous sequence of packetized voice and/or voice-band data transmitted over a network.

A "tag," in the context of the described embodiment, generally refers to information that is appended to application generated packets, such as Real-time Transport Protocol (RTP) packets or Real-time Transport Control Protocol (RTCP) packets, that allows the proxy endpoints of the reservation protocol session to transmit encapsulated packets to the appropriate remote application/endpoint (RA). According to one embodiment of the present invention, a tag includes address information, such as the destination network address of the terminal upon which the destination application/endpoint resides. When a media aggregation manager is employed in connection with a transport protocol and control protocol (such as RTP and RTCP) that use different channels or ports for control and data, control and data packets may be multiplexed onto the reservation protocol session as well by including protocol dependent control information. Then, the remote media aggregation manager may strip the tag from the encapsulated packet and determine the appropriate channel/port of the remote application/endpoint on which to forward the resulting packet based upon the additional protocol dependent control information within the tag. Advantageously, in this manner, two layers of multiplexing may be achieved; (1) a first layer that allows identification of the appropriate application at the remote media aggregation manager; and (2) a second layer that specifies a subclass/subprocess within an application.

Media Aggregation Overview

The architecture described herein seeks to resolve scalability problems observed in current reservation protocols. These scalability issues have slowed the adoption of reservation protocols in network environments where multiple applications must be provided with certainty regarding a minimum reserved bandwidth. The architecture described herein additionally seeks to address scalability problems associated with current security solutions for IP telephony product offerings. Furthermore, embodiments of the present invention seek to extend application-level intelligence, dynamic traffic engineering, and IP route control capabilities to existing IP QoS protocols.

FIG. 1A illustrates a simplified logical architecture of an enterprise VoIP network according to one embodiment of the present invention. In the example application environment depicted, two enterprise locations (e.g., branch offices or campuses) 110 and 120 may use a distributed IP network 100, such as the Internet, as a transmission medium for the transfer of voice and voice-band data. Because vendors of hardware and software for IP telephony products typically employ proprietary signaling protocols, customers are required to implement homogeneous VoIP environments with IP PBX systems and IP phone sets from the same vendor. However, according to one embodiment of the present invention, signaling and/or media gateway functionality is provided in an intermediate device, e.g., media aggregation managers 115 and 125 associated with each enterprise location 110 and 120, respectively, that allows interoperation among heterogeneous VoIP environments. For example, as a result of the protocol bridging functionality described herein, a particular enterprise location employing one vendor's IP telephony solution and products may seamlessly communicate with another enterprise location employing another vendor's IP telephony solution and products. Additionally, the media stream that flows between the enterprise locations provides very high QoS across heterogeneous, multi-vendor environments. Furthermore, embodiments of the present invention allow enterprise locations to use IP phone sets of one vendor and an IP PBX system of another.

Returning to FIG. 1A, enterprise location 110 includes one or more IP phone sets or terminals 111-113 and a media aggregation manager 115. Similarly, enterprise location 120 includes one or more IP phone sets or terminals 121-123 and a media aggregation manager 125. The enterprise locations are communicatively coupled via an IP network 100. In this example, two different IP PBX call management agents 130 and 150 are depicted. The IP PBX call management agents represent existing or future call signaling functionality, such as that provided by Cisco Systems, Inc.'s Integrated Communications System (ICS) 7750 with CallManager software, 3Com® Communications' NBX™ 100 Communications System with 3Com® Superstack® NBX Call Processor software, Avaya Inc.'s IP600 Communications Server with MultiVantage™ software, Siemens' SURPASS™ NetManager™, NEC's CX6100-CA call agent, and/or Alcatel's OmniPCX 4400 Call Server. At any rate, one IP PBX call management agent 130 is associated with enterprise location 110 and the other IP PBX call management agent 150 is associated with enterprise location 120. Advantageously, by bypassing the Public Switched Telephone Network (PSTN) (at least for long distance service) such a VoIP environment allows users to make voice calls anywhere in the world as part of their typically fixed-price Internet access rate. In any event, The IP PBX call management agents 130 and 150 may be from the same or different vendors and the IP phone sets 111-113 and 121-123 may be from the same or different vendors as the associated IP PBX call management agents 130 and 150, respectively.

Figure 1B:
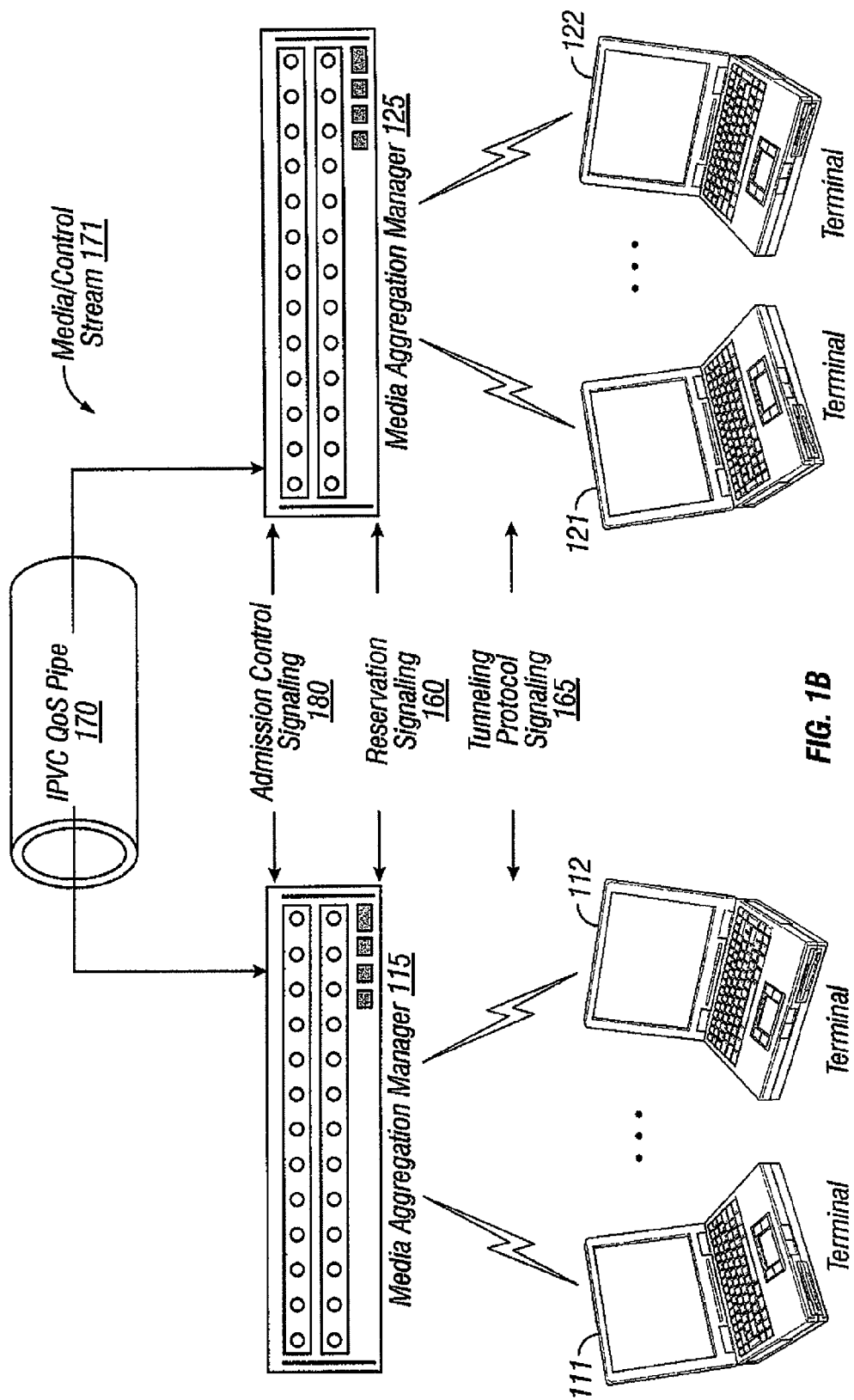
FIG. 1B conceptually illustrates interactions between two media aggregation managers according to one embodiment of the present invention.

FIG. 1B conceptually illustrates interactions between two media aggregation managers 115 and 125 according to one embodiment of the present invention. According to one embodiment, the media aggregation managers 115 and 125 act as reservation protocol proxies on behalf of the terminals 111, 112, 121, and 122. For example, the media aggregation managers 115 and 125 establish and maintain a reservation session, such as an RSVP session, between each other by exchanging reservation signaling messages 160. Subsequently, rather than establishing additional reservation protocol sessions, the media aggregation managers 115 and 125 respond to reservation requests from the terminals 111, 112, 121, and 122 by dynamically allocating the reserved resources, such as bandwidth, associated with the reservation protocol session to corresponding application sessions. In this manner, multiple application sessions may share the reservation session by multiplexing media packets onto the reservation session as described further below.

According to one embodiment, the media aggregation managers 115 and 125 may additionally act as tunnel endpoints through which encrypted voice and/or voice-band data and exchanged among the terminals 111, 112, 121, and 122. For example, one or more tunnels may be established between the media aggregation managers 115 and 125 through the pre-allocated reservation session by exchanging tunnel protocol signaling messages 165.

In this example, an IPVC QoS pipe 170 is established using admission control signaling messages 180. The media/control stream 171 is carried over the pre-allocated reservation session between media aggregation manager 115 and media aggregation manager 125. A multiplexed media/control stream represents one way to handle certain transport and control protocol combinations, such as RTP and RTCP, that use different channels or ports for control and data. In alternative embodiments, the reservation protocol session 170 may not need to distinguish between control and data.

While in some embodiments described herein, the media aggregation managers 115 and 125 are discussed as if they are autonomous network edge devices, it should be kept in mind that according to various other embodiments of the present invention some or all of the functionality of a media aggregation manager might be integrated with existing network devices, such as bridges, routers, switches, gateways, servers, and the like. Additionally, while only a single aggregated reservation protocol session between two media aggregation managers 115 and 125 is described in connection with the present example, it should be appreciated that each media aggregation manager 115 and 125 may support multiple, heterogeneous reservation protocol sessions capable of providing heterogeneous application flows among multiple user communities. According to one embodiment of the present invention, regardless of the number of terminals or application/endpoints, application flows may be provided with reserved bandwidth between any and all pairs of terminals of N user communities by establishing and sharing no more than $N^2$ reservation protocol sessions.

Network Device Overview

Figure 2:
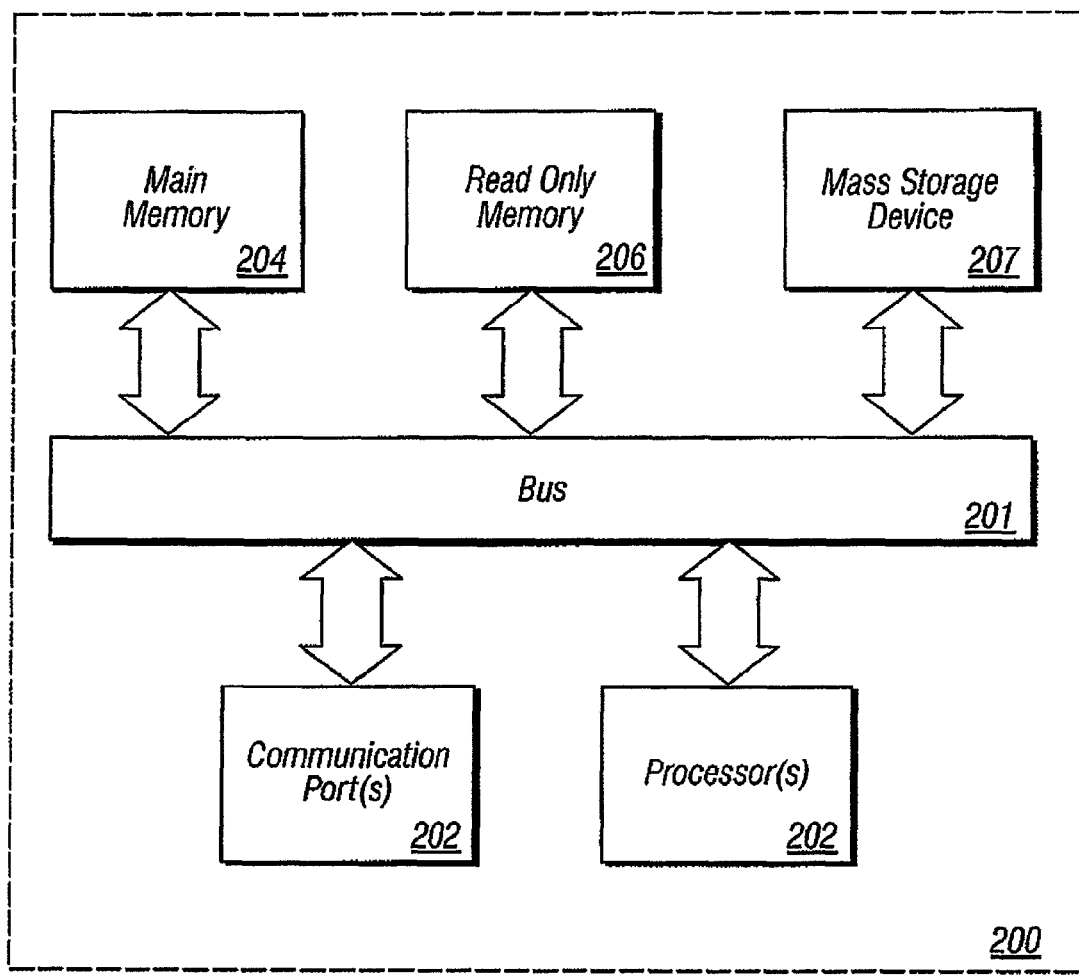
FIG. 2 is an example of a network device in which one embodiment of the present invention may be implemented.

An exemplary machine in the form of a network device 200, representing an exemplary media aggregation manager 115, in which features of the present invention may be implemented will now be described with reference to FIG. 2. In this simplified example, the network device 200 comprises a bus or other communication means 201 for communicating information, and a processing means such as one or more processors 202 coupled with bus 201 for processing information. Networking device 200 further comprises a random access memory (RAM) or other dynamic storage device 204 (referred to as main memory), coupled to bus 201 for storing information and instructions to be executed by processors 202. Main memory 204 also may be used for storing temporary variables or other intermediate information during execution of instructions by processor(s) 202. Network device 200 also comprises a read only memory (ROM) and/or other static storage device 206 coupled to bus 201 for storing static information and instructions for processor 202. Optionally, a data storage device (not shown), such as a magnetic disk or optical disc and its corresponding drive, may also be coupled to bus 201 for storing information and instructions.

One or more communication ports 225 may also be coupled to bus 201 for allowing various local terminals, remote terminals and/or other network devices to exchange information with the network device 200 by way of a Local Area Network (LAN), Wide Area Network (WAN), Metropolitan Area Network (MAN), the Internet, or the public switched telephone network (PSTN), for example. The communication ports 225 may include various combinations of well-known interfaces, such as one or more modems to provide dial up capability, one or more 10/100 Ethernet ports, one or more Gigabit Ethernet ports (fiber and/or copper), or other well-known interfaces, such as Asynchronous Transfer Mode (ATM) ports and other interfaces commonly used in existing LAN, WAN, MAN network environments. In any event, in this manner, the network device 200 may be coupled to a number of other network devices, clients and/or servers via a conventional network infrastructure, such as a company's Intranet and/or the Internet, for example.

Media Aggregation Manager

Figure 3:
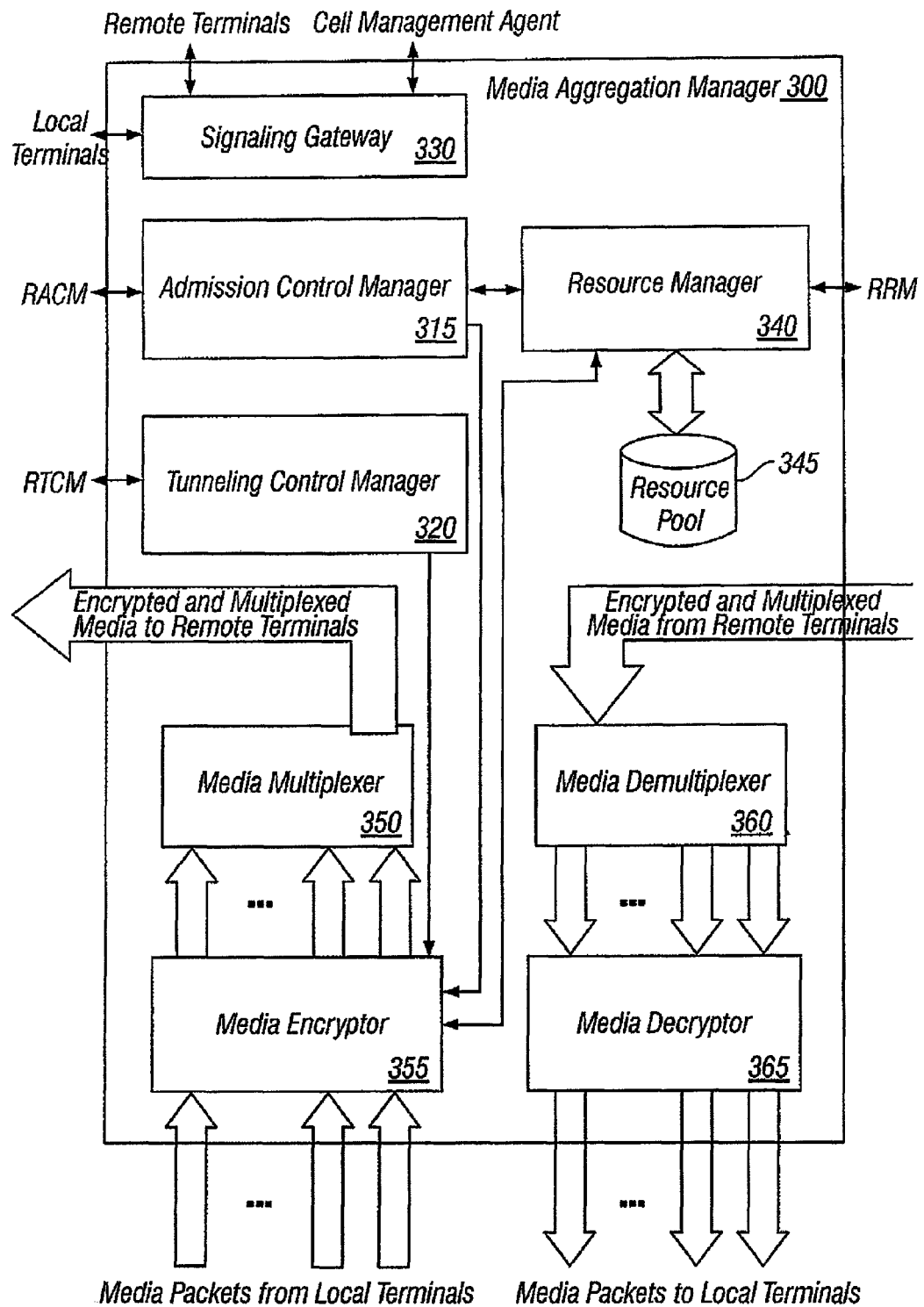
FIG. 3 is a high-level block diagram of a media aggregation manager according to one embodiment of the present invention.

FIG. 3 is a high-level block diagram of a media aggregation manager according to one embodiment of the present invention. By interconnecting a plurality of distributed media aggregation managers, such as media aggregation manger 300, a media and signaling gateway architecture is provided for moving media from a potentially multi-vendor PBX community through a high quality pipe to one or more other potentially multi-vendor PBX communities. For example, several application flows (e.g., VoIP calls) may be selectively encrypted and multiplexed over a pre-allocated reservation protocol session, such as a pre-allocated RSVP pipe, e.g., IPVC QoS pipe 170. Advantageously, the multiplexing of application flows reduces the computational resources required by the network to provide reserved bandwidth, e.g., guaranteed bandwidth, for multiple application flows. Additionally, the selective encryption at the media aggregation manager 300 is more elegant and scalable than RBE solutions due in part to the ability of the media aggregation manager's ability to maintain state on a packets-to-call mapping basis. Furthermore, in a VoIP environment, the logical positioning of the media aggregation managers 300 relative to the terminals enables it to (1) apply application-level intelligence to determine which packets can traverse the IPVC QoS pipe 170, (2) gather and maintain routing information and realtime route performance data to ensure efficient bandwidth utilization, least-cost routing, and optimal service performance, and (3) perform selective encryption (e.g., optional encryption only on voice related packets) rather than encrypting every packet that hits the router as would be the case in a RBE solution.

In the example depicted, the source media aggregation manager receives media packets from its local terminals and transmits encrypted multiplexed media to the destination aggregation manager. The destination aggregation manager receives the encrypted multiplexed media and routes media packets to the appropriate terminal(s) of its local terminals by performing demultiplexing and decryption.

In this example, the media aggregation manger 300 includes an application/protocol specific media multiplexor 350, an application/protocol specific media demultiplexor 360, a media encryptor 355, a media decryptor 365, an admission control manager 315, a tunneling control manager 320, a signaling gateway 330, a generic resource manager 340, and a resource pool 345. In a software implementation, instances of the media multiplexor 350, media demultiplexor 360, and admission control manager 315 may be created for each particular application/protocol needed to allow communications between terminals of the geographically diverse user communities. Similarly, appropriate instances of the signaling gateway 330 can be instantiated depending upon signaling translations required by the particular environment. Importantly, it should be appreciated that the particular partitioning of functionality described with reference to this example is merely illustrative of one or many possible allocations of functionality.

According to the embodiment depicted, the resource manager 340 establishes and maintains one or more pre-allocated reservation protocol sessions between the local media aggregation manager and one or more remote media aggregation managers. The resource manager 340 optionally interfaces with a centralized entity that provides information relating to the characteristics and estimated amount of resources for the pre-allocated reservation protocol sessions. Alternatively, a network administrator may provide information to the resource manager 340 relating to desired characteristics of the pre-allocated reservation protocol sessions. The resource manager 340 also tracks active application sessions for each reservation protocol session and the current availability of resources for each reservation protocol session in the resource pool 345.

The signaling/media gateway 330 interfaces with the local terminals and one or more other remote signaling gateways (RSGs) associated with other user communities to perform signaling/media translation between the potentially different proprietary signaling protocols employed at the local and remote user communities. Additionally, according to one embodiment, the signaling gateway 330 may be logically interposed between the local terminals and the associated call management agent to perform local signaling and/or media translation between local terminals and the associated call management agent. In this manner, IP phones and IP PBXs of different vendors can be mixed and matched to allow media from one potentially multi-vendor PBX community to be moved through a high quality pipe to one or more other potentially multi-vendor PBX communities.

The tunneling control manager 320 interfaces with the media encryptor 350 and one or more other remote tunneling control managers (RTCMs) associated with other user communities to agree upon encryption, such as Message Digest 5 (MD5), RSA Data Encryption Standard (DES) or other encryption standard, key management, and/or a tunneling protocol to be employed for a particular application session, such as existing or future versions of the IP Security (IPSec) Protocol, generic routing encapsulation (GRE), Layer 2 Forwarding (L2F), Layer 2 Tunneling Protocol (L2TP), or the Point-to-Point Tunneling Protocol (PPTP).

The media encryptor 355 receives media packets from the local terminals (not shown) and selectively encrypts the media packets for exchange with the media decryptor 365 of the remote media aggregation manger as previously agreed upon by the participating tunneling control managers based upon the application session with which the media packets are associated. In this manner, security may be configured on an application session basis (e.g., a call-by-call basis).

The admission control manager 315 interfaces with local terminals (not shown) associated with a particular user community, the media multiplexor 350, the resource manager 340, and one or more other remote media aggregation managers associated with other user communities. Importantly, in one embodiment, the media multiplexor 350 hides the details of how reserved resources are internally allocated and managed, thereby allowing the local terminals to use existing reservation protocols, such as RSVP, without change.

The media multiplexor 350 receives selectively encrypted media packets from the media encryptor 355 and appropriately translates/encapsulates the packets for communication with the media demultiplexor 360 of the remote media aggregation manger in accordance with the aggregation technique described further below. When application flows are established and terminated, the admission control manager 315 interfaces with the resource manager 340 to allocate and deallocate resources, respectively.

The media demultiplexor 360 interfaces with the media decryptor 365 to supply the media decryptor 365 with the selectively encrypted media packets by demultiplexing the respective application flows from the pre-allocated reservation protocol session. The media decryptor 365 then decrypts the media packets, if necessary, and forwards them to the appropriate local terminals (not shown).

The admission control manager 315 exchanges admission control signaling messages with remote admission control managers and configures the local application/endpoint (LA) to send media to transmitted to the local media aggregation manager after an application session has been established with a remote media aggregation manager. For VoIP using the H.323 protocol, the admission control manager 315 may include RAS, call control, and call signaling processing.

When application flows are established and terminated, the admission control manager 315 interfaces with the resource manager 340 to allocate and deallocate resources, respectively.

In operation, two resource managers cooperate to establish a pre-allocated reservation protocol session between a local media aggregation manager (LMAM) and a remote media aggregation manager (RMAM). The resource managers make a reservation that is large enough to accommodate the anticipated load offered by applications that need to communicate over the reservation protocol session. Subsequently, a local media encryptor (LME) associated with the LMAM provides admission control for application flows between one or more terminals of the LMAM and the RMAM with the assistance of the local and remote admission control managers and the local and remote resource managers. If sufficient resources, such as bandwidth, are available over the pre-allocated reservation protocol session, then the LME selectively encrypts the application flows and the local media multiplexor (LMM) multiplexes the application flows for transmission over the pre-allocated reservation protocol session. On the receiving end, the remote media demultiplexor (RMDX) demultiplexes the application flows and sends them to their intended destinations through the remote media decryptor (RMD) which performs any necessary decryption. The typical admission control manager 315 will be a player in the path of the application protocol for setting up the connection between two or more application endpoints; hence, it may be instrumented to modify the path of the media packets to flow through the LME, LMM, the remote media encryptor (RME), and the remote media multiplexor (RMM).

In brief, after an application session has been associated with the pre-allocated reservation protocol session, the application/endpoints may use a transport protocol and/or a control protocol, such as RTP and/or RTCP to exchange encrypted media packets between them. The media packets may carry various types of real-time data, such as voice, voice-band data, video, multi-media, real-time market data, mission critical data, or other data for human interactions or collaboration. Media packets from a data source are optionally encrypted by the local media encryptor 355, tagged by the local media multiplexor 350, and sent over the reserved path to one or more media demultiplexors 360 corresponding to the data destination. As illustrated below, the media demultiplexor 360 strips the tag before the media packets are forwarded, the media decryptor 360 performs decryption processing, and then the tag information is used to determine the ultimate destination of the data packet.

According to one embodiment, from the perspective of the local terminals, they are establishing and using reservation protocol sessions for each application flow and communicating in the clear. However, in reality, the media aggregation manger 300 shares the pre-allocated reservation protocol session among multiple application flows and transparently performs encryption and/or decryption as necessary.

As will be described further below; a specific example of the use of this architecture is in connection with the use of the H.323 protocol for VoIP calls. Typically, an H.323 Gatekeeper is used by endpoints to help in address resolution, admission control etc. So, for the H.323 protocol, the gatekeeper is a convenient place for the media multiplexor 350 and/or media encryptor 355 to reside. Alternatively, the media aggregation manager 300 may implement the H.323 gatekeeper functionality and act as a gatekeeper for devices, such as IP PBXs.

Note that in this description, in order to facilitate explanation, the media aggregation manager 300 is generally discussed as if it is a single, independent network device or part of single network device. However, it is contemplated that the media aggregation manager 300 may actually comprise multiple physical and/or logical devices connected in a distributed architecture; and the various functions performed may actually be distributed among multiple network devices. Additionally, in alternative embodiments, the functions performed by the media aggregation manager 300 may be consolidated and/or distributed differently than as described. For example, any function can be implemented on any number of machines or on a single machine. Also, any process may be divided across multiple machines. Specifically, the media multiplexor 350 and the media encryptor 355 may be combined as a single functional unit or the multiplexing and encrypting processing may be performed in the opposite order than described above. Similarly, the media demultiplexor 360 and the media decryptor 365 may be combined as a single functional unit or the demultiplexing and decrypting processing may be performed in the opposite order than described above, e.g., encryption may be performed before or after multiplexing. Finally, encryption may be performed at various levels of the application flow. For example, encryption may be performed on the media and/or control information directly, the media and/or control packets, or on multiplexed media and/or control packets.

Sharing a Pre-Allocated Reservation Protocol Session

Figure 4:
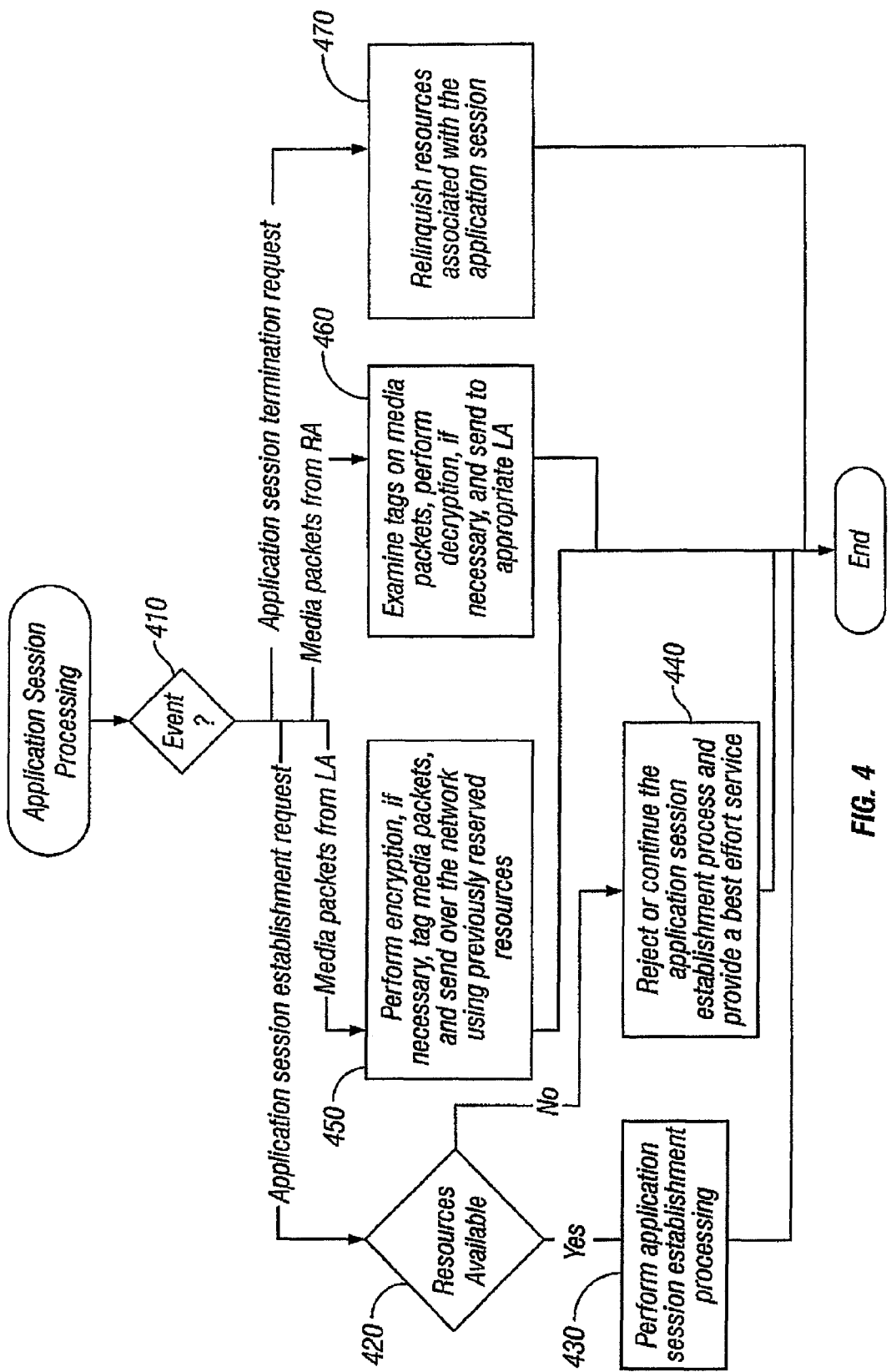
FIG. 4 is a simplified, high-level flow diagram illustrating application session processing according to one embodiment of the present invention.

FIG. 4 is a simplified, high-level flow diagram illustrating application session processing according to one embodiment of the present invention. In one embodiment, the processing blocks described below may be performed under the control of a programmed processor, such as processor 202. However, in alternative embodiments, the processing blocks may be fully or partially implemented by any programmable or hard-coded logic, such as Field Programmable Gate Arrays (FPGAs), TTL logic, or Application Specific Integrated Circuits (ASICs), for example.

In this example, it is assumed that a reservation protocol session has been previously established. The pre-allocated reservation protocol session preferably takes into consideration current network resources and estimated usage of network resources, such as bandwidth, based upon historical data. For example, the amount of preallocated resources may vary due to different loads being offered at different times of day and/or day of week.

At any rate, at decision block 410, the media aggregation manager 300 determines the type of event that has occurred. If the event represents the receipt of an application session establishment request from a local terminal, then processing proceeds to decision block 420. If the event represents the receipt of media packets from a local application/endpoint, then processing continues with decision block 450. If the event represents the receipt of a media packet from a remote application/endpoint, then control passes to processing block 460. If the event represents the receipt of an application session termination request, then processing continues with processing block 470.

At decision block 420, a determination is made whether resources are available to meet the needs identified in the application session establishment request. For example, the resource manager 340 may determine if sufficient bandwidth is available on an appropriate pre-allocated reservation protocol session by comparing a minimum bandwidth specified in the application session establishment request to a bandwidth availability indication provided by the resource pool 345.

If adequate resources are available to provide the requestor with the minimum resources requested, processing continues with processing block 430 where application session establishment processing is performed. Application session establishment processing is described below with reference to FIG. 5. Otherwise, if there are insufficient resources to accommodate the application session establishment request, processing branches to processing block 440. At processing block 440, the media aggregation manager 300 may reject the application session establishment request. Alternatively, the media aggregation manager 300 may continue the application session establishment process and provide a best effort service for the request (without the use of pre-allocated resources, e.g., the IPVC QoS pipe 170).

At processing block 450, media packets received from a local application/endpoint are selectively encrypted depending upon the application session with which they are associated, tagged, and sent over the network to the destination using the previously reserved resources (e.g., the pre-allocated reservation protocol session 170). The tagging and multiplexing of media packets onto the pre-allocated reservation protocol session will be discussed in detail below.

At processing block 460, potentially encrypted and multiplexed media packets received from a remote application/endpoint are decrypted, if necessary, and forwarded to the appropriate local application/endpoint. For example, the packets may be sent to the appropriate local application/endpoint based upon an examination of the tag information added by the remote media aggregation manager.

At processing block 470, in response to an application session termination request, resources allocated to this application session are relinquished and made available for other application sessions. For example, the resource manager 340 may update an indication of available resources in the resource pool 345 for the pre-allocated reservation protocol session associated with the terminated application session.

Figure 5:
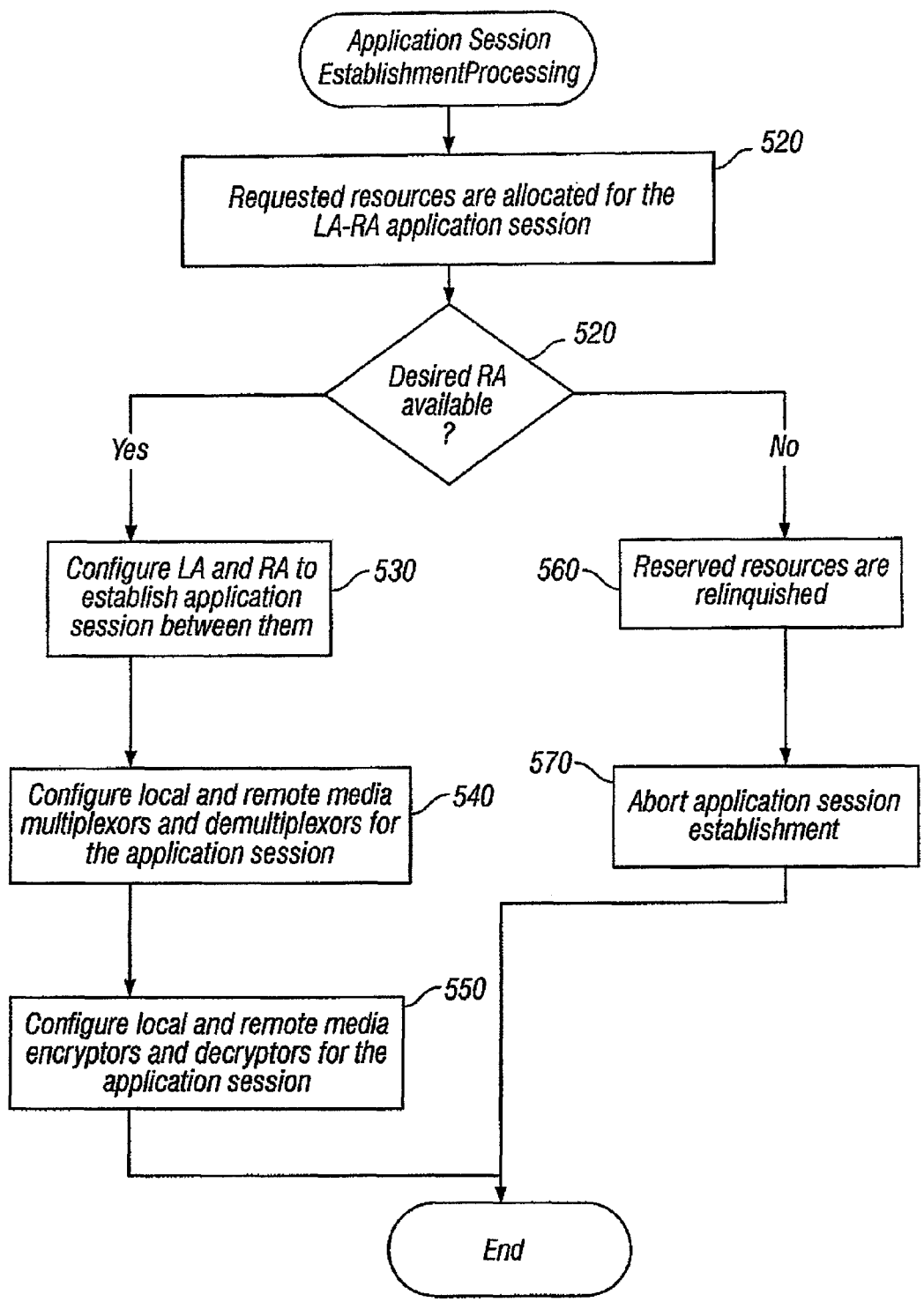
FIG. 5 is a simplified, high-level flow diagram illustrating application session establishment processing according to one embodiment of the present invention.

FIG. 5 is a simplified, high-level flow diagram illustrating application session establishment processing according to one embodiment of the present invention. In the present example, application session establishment processing begins with processing block 510. At processing block 510, the requested resources are allocated to the application session. According to one embodiment, the local resource manager 340 creates a new application session entry, in the resource pool 345, containing an indication of the resources granted to the application session.

At decision block 520, a determination is made whether the desired remote application/endpoint is available to participate in the application session. If so, processing proceeds to processing block 530; otherwise, processing branches to processing block 560

Assuming the desired remote application/endpoint is available to participate in the application session, then at processing block 530, the local application/endpoint and the remote application/endpoint are configured to send media packets associated with the application session to the local and remote media multiplexors, respectively.

At processing block 540, the local and remote media multiplexors and demultiplexors are configured in accordance with the application session. For example, as described further below, a lookup table may be maintained by the media multiplexor 350 or media demultiplexor 360 to translate the source network address of the local application/endpoint to the destination network address of the remote application/endpoint.

Finally, at processing block 550, the local and remote media encryptors 355 and decryptors 365 are optionally configured in accordance with the desired level of security for the application session. Exemplary standards-based encryption options include Message Digest S (M5), RSA Data Encryption Standard (DES), and Triple DES encryption. Exemplary tunneling options include the IP Security (IPSec) Protocol, generic routing encapsulation (GRE), Layer 2 Forwarding (L2F), Layer 2 Tunneling Protocol (L2TP), or the Point-to-Point Tunneling Protocol (PPTP).

Figure 6:
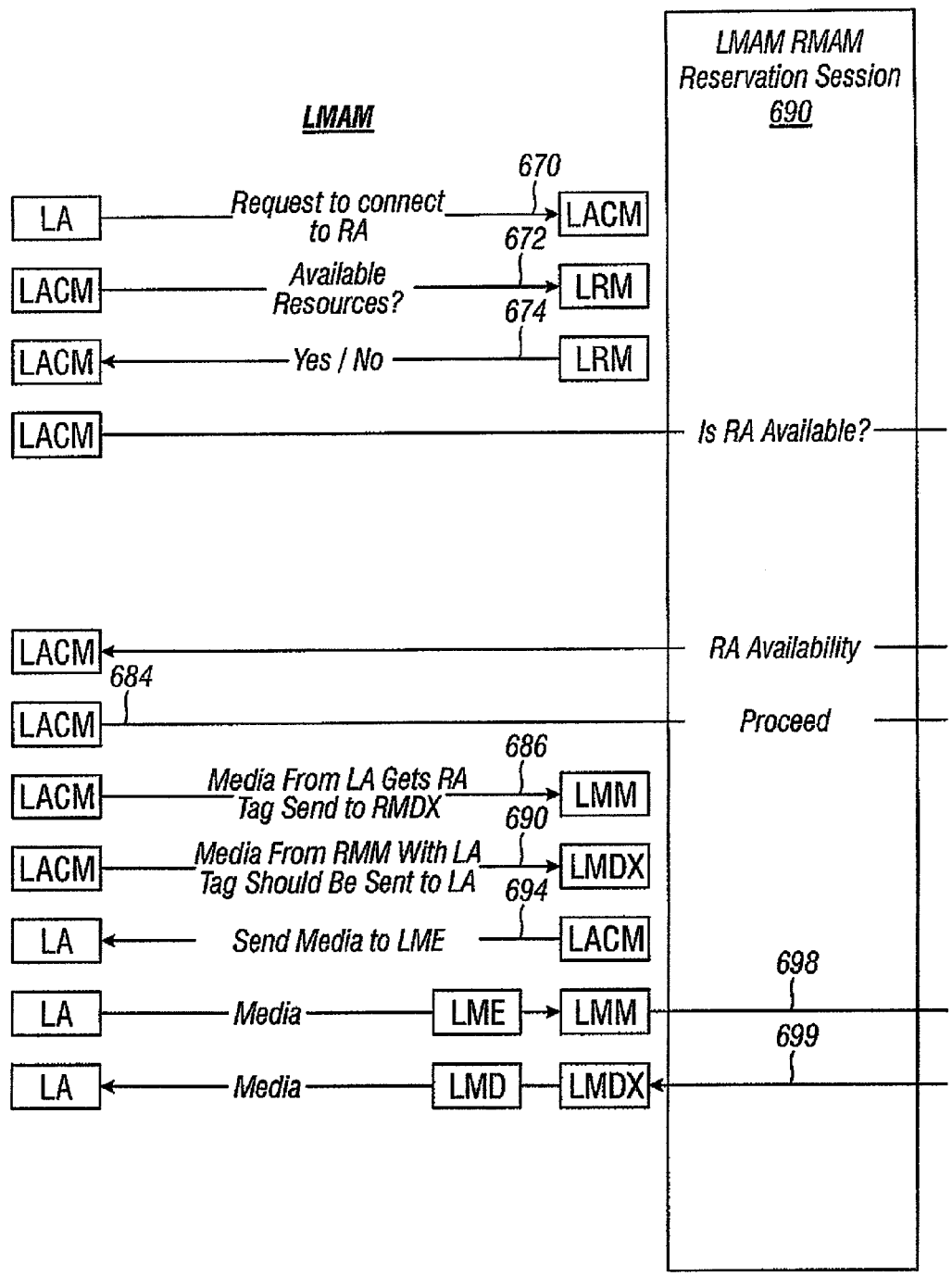
FIG. 6 illustrates interactions among local and remote media aggregation manager functional units according to one embodiment of the present invention.
Figure 6:
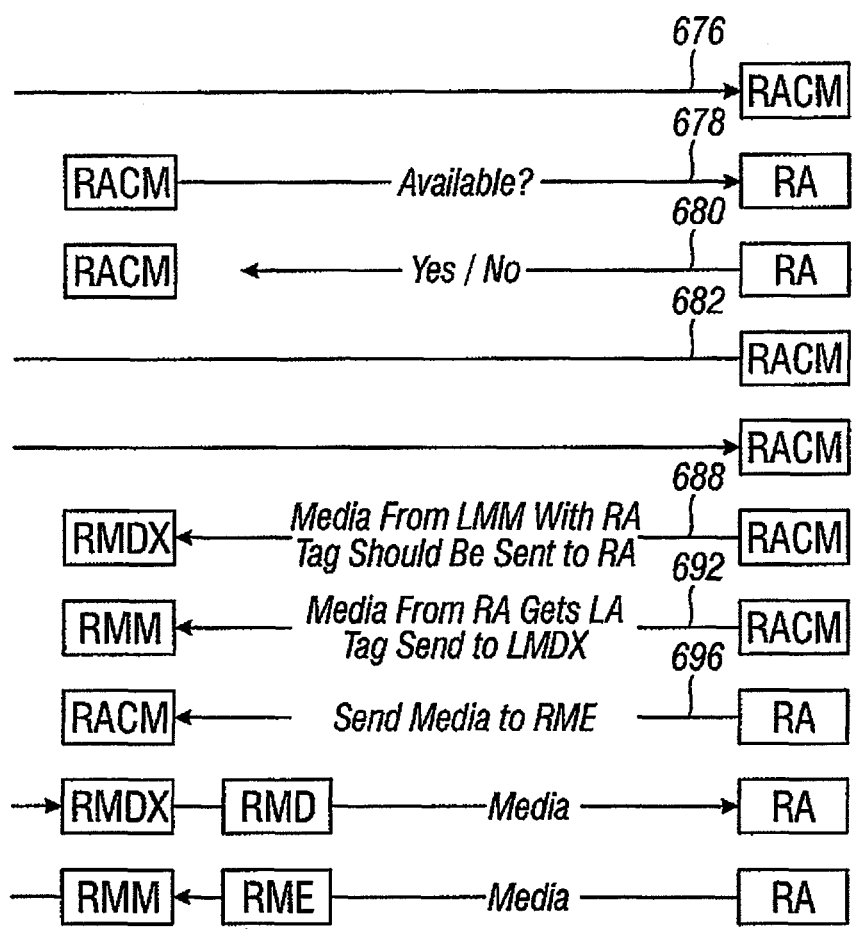

FIG. 6 illustrates interactions among local and remote media aggregation manager functional units according to one embodiment of the present invention. In general, according to the present example, the media aggregation managers abstract the true application session endpoints from each other and serve as proxies for their respective local applications/endpoints. The media aggregation managers accomplish this by intercepting messages originating from their respective local applications/endpoints and modifying the messages to make themselves appear as the actual application flow originators/recipients.

In this example, for simplicity, it is assumed that a single local application/endpoint (LA) is establishing an application session with a single remote application/endpoint A) over a pre-allocated reservation protocol session 690 between a local media aggregation manager (LMAM) logically associated with or geographically proximate to the LA and a remote media aggregation manager (RMAM) logically associated with or geographically proximate to the RA.

The LA transmits a request to connect to the RA to the LMAM (670). The LACM inquires of the local resource manager (LRM) whether sufficient resources are currently available to accommodate the LA's request (672). The LRM indicates the availability or inavailability of available resources to the LACM (674).

Assuming sufficient resources are available to provide the reserved resources the LA needs for the requested connection to the RA, then the LACM asks the RACM if the RA is available (676). In response to the LACM's request, the RACM queries the RA to determine its present availability (678). The RA indicates whether or not it is currently available to participate in an application session (680).

Assuming, the RA indicates that it is available, then the RACM communicates the RA's availability to the LACM (682). In response to the availability of the RA, the LACM directs the RACM to proceed with establishment of a connection between the LA and RA.

Having determined that a connection is feasible, the LACM and RACM proceed to configure their media multiplexors and media demultiplexors for the LA-RA connection. The LACM configures the local media multiplexor (LMM) to tag media originated from the LA for routing to the RA and to send the resulting encapsulated media packets to the remote media demultiplexor (RMDX) (686). The LACM further configures the local media demultiplexor (LMDX) to forward media packets that are received from the RMM and tagged as being associated with the LA-RA connection to the LA (690).

Similarly, the RACM configures the remote media demultiplexor (RMDX) to forward media packets that are received from the LMM and tagged as being associated with the LA-RA connection to the RA (688). The RACM also configures the remote media multiplexor (RMM) to tag media originated from the RA for routing to the LA and to send the resulting encapsulated media packets to the local media demultiplexor (LMDX) (692).

Once the media multiplexors and media demultiplexors have been appropriately configured for the LA-RA connection, the LACM and the RACM inform their application/endpoints to commence transmission of media to the LME and the RME, respectively 694 and 696. Thus, the media aggregation managers appear to their respective application/endpoints as the actual application flow originators/recipients and subsequently serve as proxies for their respective application/endpoints.

During media transmission between the LA and the RA 698 and 699, media packets originated by the LA are sent to the LME for optional encryption, then to the LMM, which encapsulates the media packets by appending a tag appropriate for the LA-RA connection and forwards the encapsulated packets over the pre-allocated reservation protocol session 690 to the RMDX. The RMDX determines the RA is the intended destination based upon the tag, removes the tag, and forwards the media packet to the RA via the RMD. Media packets originated by the RA are sent to the RME which performs encryption then to the RMM which encapsulates the media packets by appending a tag appropriate for the LA-RA connection and forwards the encapsulated packets over the pre-allocated reservation protocol session 690 to the LMDX. The LMDX determines the LA is the intended destination based upon the tag, removes the tag, and forwards the media packet to the LA via the local media decryptor (LMD).

An Exemplary H.323 VoIP Implementation

H.323 is basically an umbrella that covers several existing protocols; including but not limited to H.225.0, and H.245. The later two protocols are used to establish call connection, and capability information between two endpoints. Once this information is exchanged, the endpoints may use RTP and RTCP to exchange voice, voice-band data, and multi-media information between them.

H.323 suggests that RTP/RTCP should be established between two endpoints (caller/receiver) for each call. Consequently, in order to provide QoS for each call using a protocol like RSVP would mean that every endpoint pair (caller/receiver) for every H.323 call would need to establish RSVP between one another. This would create a huge amount of overhead on the endpoint and adversely affect network resources as RSVP "soft states" must be maintained for the life of the call. This quickly becomes a tremendous scalability issue, since as number of simultaneous calls increase, so do the RSVP "soft state" maintenance messages between endpoints, and every router involved in the transmitting RTP/RTCP data stream.

Embodiments of the media aggregation manager 300 described herein seek to provide a clean, and scalable solution for this problem, while providing the same QoS as if two individual endpoints had used a reservation protocol session, such as RSVP, between them. Briefly, in the context of a H.323 VoIP embodiment, the H.323 endpoints (callers/receivers) need not have knowledge of how to establish and maintain RSVP sessions. Instead, the media aggregation managers may establish one or more RSVP "pipes" between them that can accommodate several (expected) voice calls. These RSVP pipes are created as the media aggregation managers are started and the RSVP pipes are dynamically maintained between them. This immediately reduces the amount of RSVP state processing in the network. The RSVP pipes between media aggregation managers may be created based upon an educated estimate of the number of calls that are expected between user communities being managed by these media aggregation managers. Since RSVP by nature is established between a specific IP address/port pair and since the pipes are pre-created between media aggregation managers, all voice traffic (e.g., RTP/RTCP) originates and terminates between media aggregation managers at the media multiplexor 350 and the media demultiplexor 360, respectively.

In this manner, according to one embodiment, the "local" media aggregation manager appears to an H.323 voice application caller as its intended receiver. The H.323 endpoints make calls to the local media aggregation managers without realizing the local media aggregation managers are not really the final destination. The local media aggregation manager calls the remote media aggregation manager and passes the RTP/RTCP voice data to it. The remote media aggregation manager receives the voice data and sends it the "real" receiver while hiding all mutiplexing details from both the caller and the receiver. However, as the voice data is actually exchanged between media aggregation managers over the network it gets RSVP treatment, reserved bandwidth, and QoS. Advantageously, this solution serves as a surrogate to route calls over the pre-created RSVP pipes eliminating QoS processing by endpoints, without any deviations from each involved standard protocol.

Figure 7:
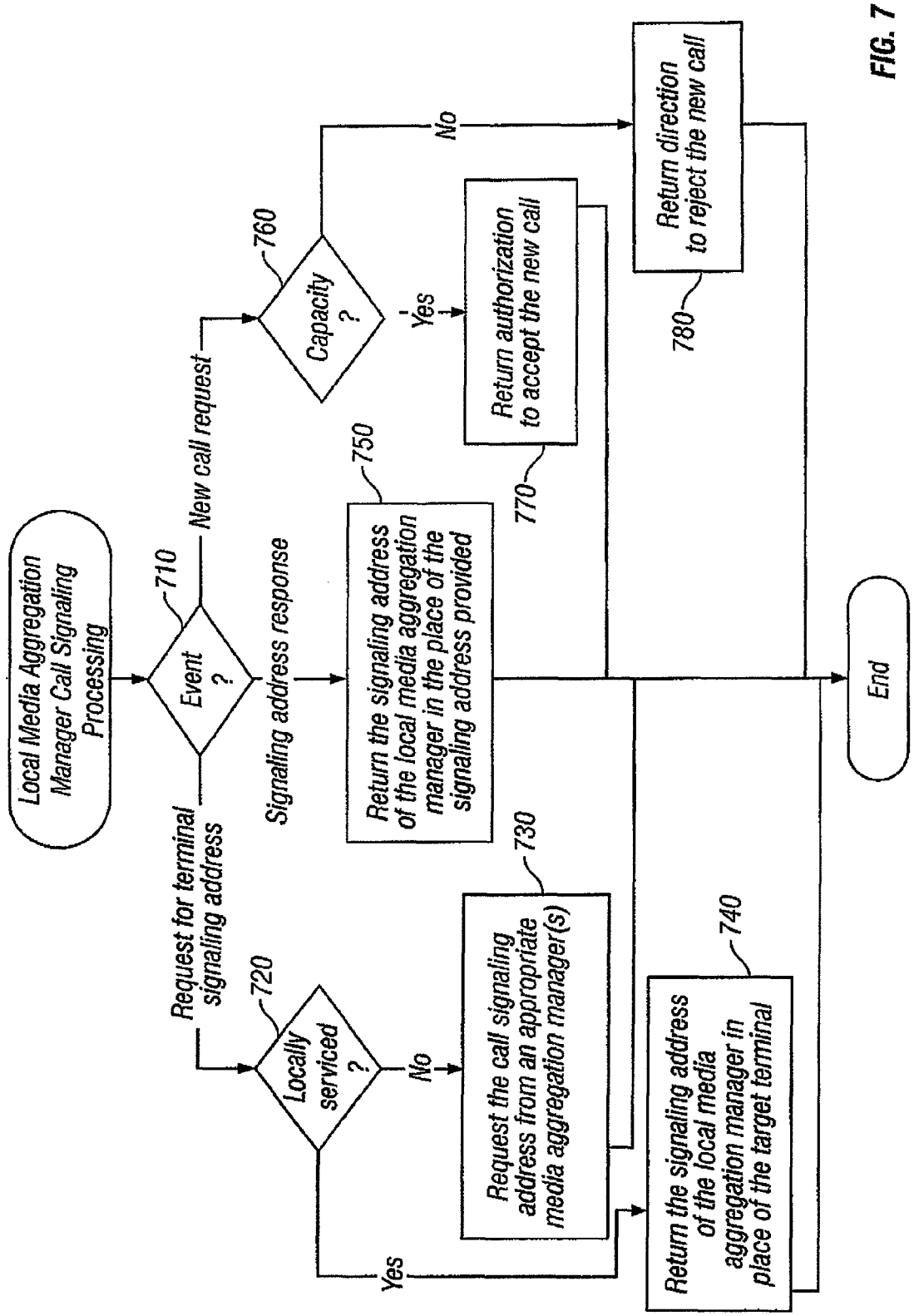
FIG. 7 is a flow diagram illustrating Registration, Admission, Status (RAS) signaling processing according to one embodiment of the present invention.

Referring now to FIG. 7, a flow diagram illustrating exemplary Registration, Admission, Status (RAS) signaling processing will now be described. At decision block 710, the appropriate processing path is determined based upon the triggering event. If the event is a request for a terminal's signaling address then processing proceeds to decision block 720. If the event represents a signaling address response, then control flow branches to processing block 750. However, if the event is a new call request, then processing continues with decision block 760.

At decision block 720, in response to a request for a terminal signaling address, a determination is made whether or not the terminal is locally serviced. If it is determined that the terminal is not serviced by the media aggregation manager 300, then processing continues with processing block 730; otherwise processing proceeds to processing block 740.

At processing block 730, the media aggregation manager 300 requests the call signaling address from an appropriate remote media aggregation manager. For example, the local media aggregation manager may transmit a multicast message or a directed broadcast to locate the appropriate remote media aggregation manager that services the desired terminal.

At processing block 740, the media aggregation manager 300 returns its own signaling address rather than the signaling address of the locally serviced terminal. In this manner, subsequent call signaling and control signaling is routed through the local media aggregation manager rather than letting the locally service terminal handle this signaling directly.

At processing block 750, in response to a signaling address response, the media aggregation manager 300, as above, returns its signaling address in place of the signaling address of the locally serviced terminal to abstract call and control signaling from the locally serviced terminal.

At decision block 760, in response to a new call request on the RAS channel of the media aggregation manager 300, a determination is made whether there is capacity for the new call. For example, the local resource manager verifies whether the reservation protocol session over which the new call will be multiplexed can accommodate the additional bandwidth requirements of the new call. At any rate, if the local resource manager determines that the reservation protocol session has adequate resources for the new call, then processing continues to processing block 770. Otherwise, control flows to processing block 780.

At processing block 770, the media aggregation manager 300 returns an indication that the new call can be accepted. At processing block 780, the media aggregation manager 300 returns direction to reject the new call.

Advantageously, since the terminals/phones register with the media aggregation manager 300, additional authentication processing can be performed in addition to optional encryption, thereby also serving as a checkpoint for only accepting packets from those entities/end points/phones that have previously registered.

Figure 8:
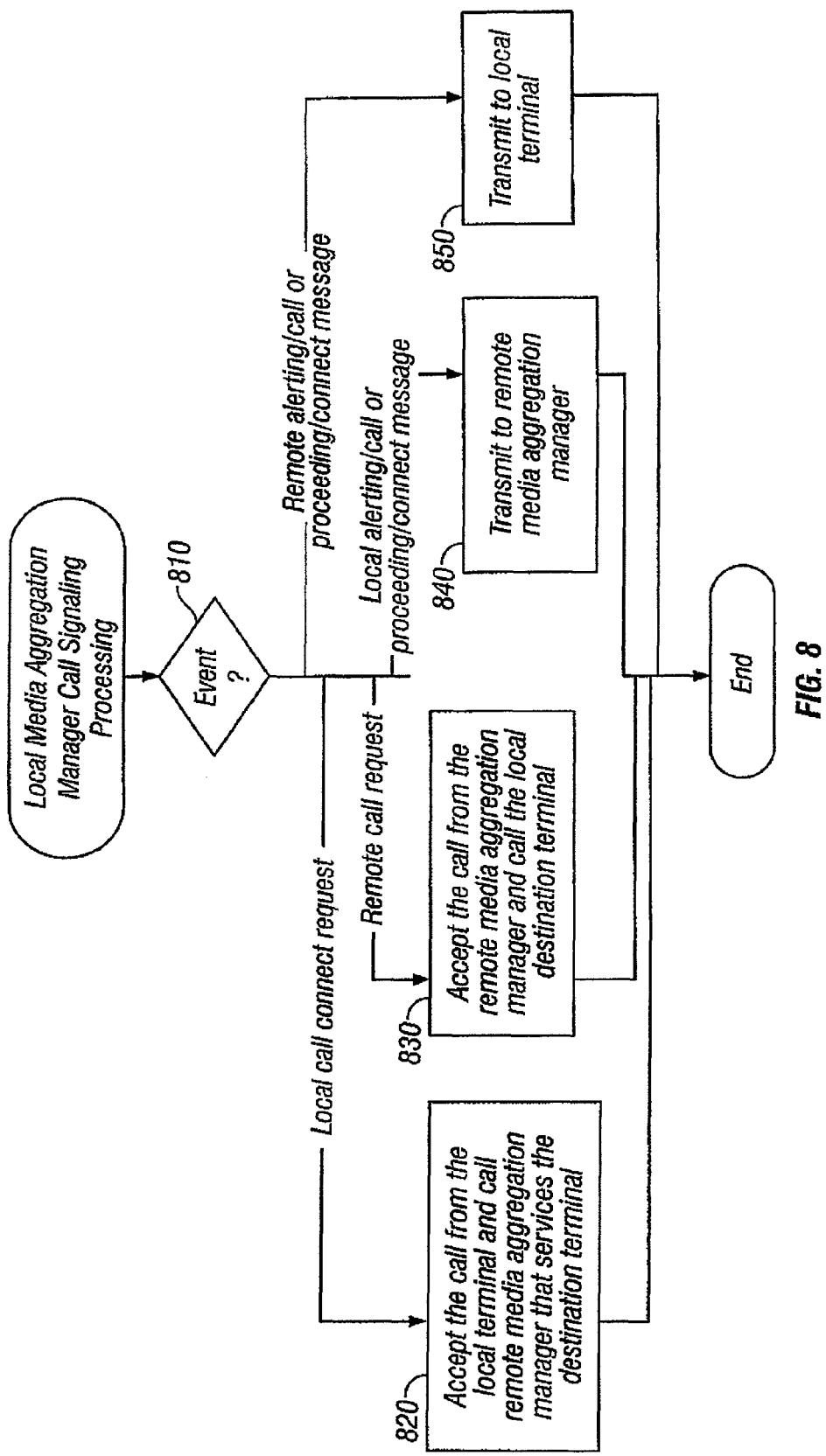
FIG. 8 is a flow diagram illustrating call signaling processing according to one embodiment of the present invention.

FIG. 8 is a flow diagram illustrating call signaling processing according to one embodiment of the present invention. At decision block 810, the appropriate processing path is determined based upon the event that has triggered the call signaling processing tread. If the event is a local call connect request, the processing proceeds to processing block 820. If the event represents a remote call connect request, then control flow branches to processing block 830. If the event is a local alerting/call or proceeding/connect message, then processing continues with processing block 840. However, if the event is a remote alerting/call or proceeding/connect message, the processing proceeds with processing block 850.

At processing block 820, in response to a local call connect request, the media aggregation manager 300 accepts the call from the local terminal and calls the remote media aggregation manager that services the destination terminal. In this manner, the local media aggregation manager poses as the intended receiver to its local terminals that are callers.

At processing block 830, in response to a remote call connect request, the media aggregation manager 300 accepts the call from the remote media aggregation manager and calls the intended recipient, e.g., on of the terminals serviced by the local media aggregation manager. In this manner, the local media aggregation manager poses a caller to its local terminals that are receivers.

At processing block 840, in response to a local alerting/call or proceeding/connect message, the local media aggregation manager relays the message to the appropriate remote media aggregation manager(s).

At processing block 850, in response to a remote alerting/call or proceeding/connect message, the local media aggregation manager relays the message to the appropriate local terminal(s). After processing block 850, call signaling is complete and control protocol signaling (e.g., H.245) can begin.

Figure 9:
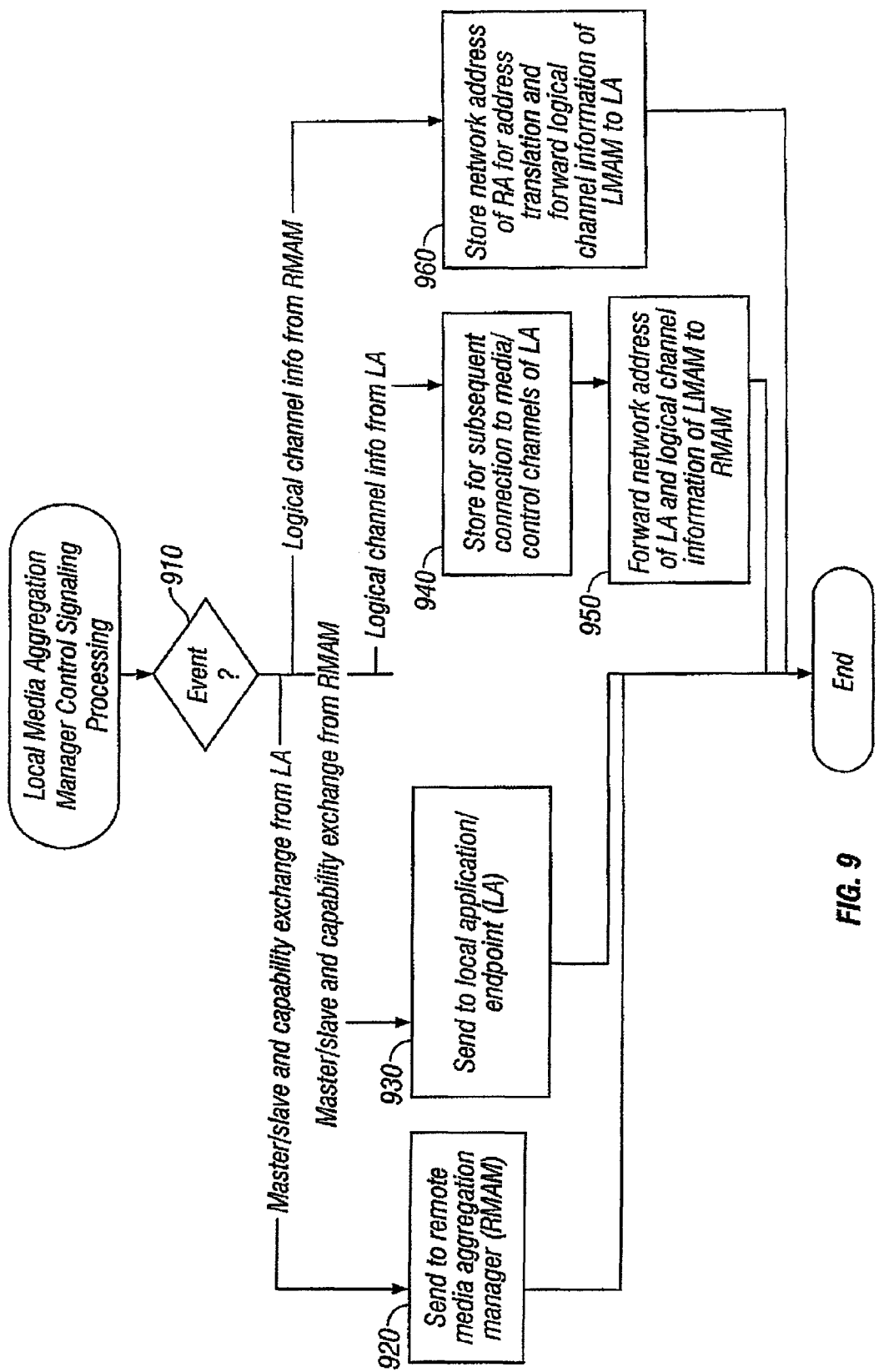
FIG. 9 is a flow diagram illustrating control signaling processing according to one embodiment of the present invention.

FIG. 9 is a flow diagram illustrating control signaling processing according to one embodiment of the present invention. At decision block 910, the appropriate processing path is determined based upon the event that has triggered the control signaling processing tread. If the event is receipt of a master/slave and capability exchange from a local application/endpoint, the processing proceeds to processing block 920. If the event represents receipt of a master/slave and capability exchange from a remote media aggregation manager, then control flow branches to processing block 930. If the event is receipt of logical channel information from a local application/endpoint, then processing continues with processing block 940. However, if the event is reception of logical channel information from a remote media aggregation manager, the processing proceeds with processing block 950.

At processing block 920, the master/slave and capability exchange is transmitted to the remote media aggregation manager.

At processing block 930, the master/slave and capability exchange is transmitted to the local application/endpoint. At processing block 940, the logical channel information from the local application/endpoint is stored in anticipation of making a connection with the media and/or control channels of the local application/endpoint.

At processing block 950, the LMAM forwards its own logical channel information to the RMAM. Additionally, the network address of the LA is sent to the RMAM.

At processing block 960, the network address of the RA is stored in a lookup table for address translation and the logical channel information of the LMAM is forwarded to the LA.

Figure 10:
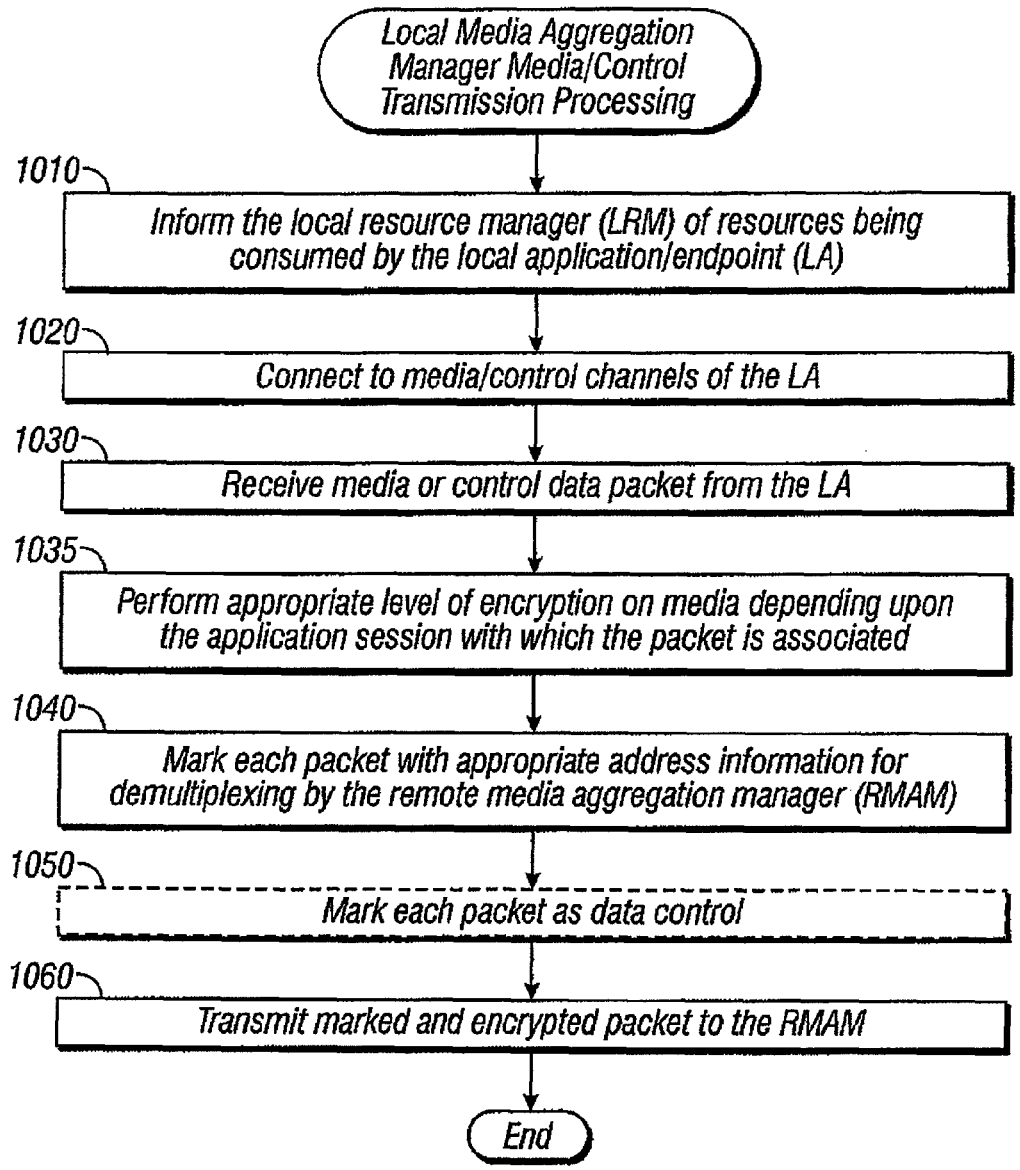
FIG. 10 is a flow diagram illustrating media/control transmission processing according to one embodiment of the present invention.

FIG. 10 is a flow diagram illustrating media/control transmission processing according to one embodiment of the present invention. At processing block 1010, the local media multiplexor reports the resources being consumed by the local application/endpoint to the local resource manager.

At processing block 1020, the media aggregation manager 300 connects to the media and/or control channels of the local application/endpoint.

At processing block 1030, media and control packets generated by the local application/endpoint are received by the local media encryptor (LME). Depending upon the application session with which the media packets are associated the appropriate form of encryption is applied to the media packets at processing block 1035.

According to this example, at processing block 1040, after optional encryption is performed, the media multiplexor 350 marks the outbound packets with appropriate address information (referred to as a "tag") for demultiplexing at the remote media aggregation manager. The tag is typically appended to transport protocol packets, such as TCP or RTP packets, to allow the media multiplexor 350 to direct packets to the appropriate remote application/endpoint. According to one embodiment, the tag includes address information, such as the destination network address associated with the remote application/endpoint. The destination network address may be determined with reference to a lookup table that allows translation between the source network address associated with the local application/endpoint and the destination network address associated with the remote application/endpoint. Alternatively, a lookup table may be maintained on the media demultiplexor 360 and the tag would include the source network address associated with the local application/endpoint. Then, the source network address would be used by the remote media demultiplexor to determine how to route the inbound packet to the appropriate remote application/endpoint.

When different channels or ports are used for transport and control protocols (such as RTP and RTCP), then the tag may also include additional protocol dependent control information to allow multiplexing of data and control packets onto the reservation protocol session. Therefore, at optional processing block 1050, each outbound packet may additionally be marked as control or data to allow the remote media aggregation manager to determine the appropriate channel/port of the remote application/endpoint on which to forward the packet.

Finally, at processing block 1060, the marked packet is transmitted to the appropriate remote media aggregation manager(s).

Figure 11:
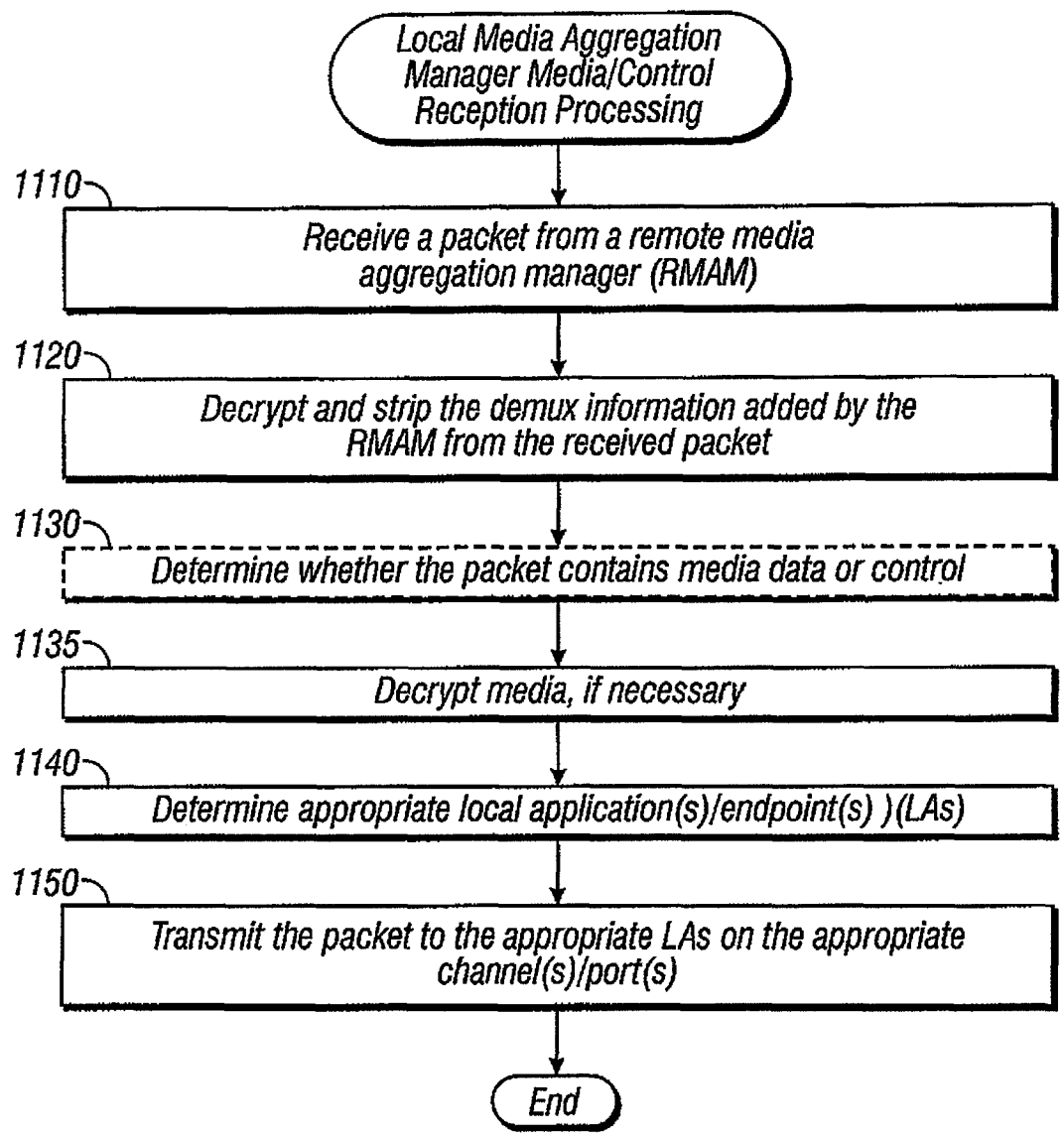
FIG. 11 is a flow diagram illustrating media/control reception processing according to one embodiment of the present invention.

FIG. 11 is a flow diagram illustrating media/control reception processing according to one embodiment of the present invention. At processing block 1110, a packet is received from a remote media aggregation manager. The demultiplexing information (e.g., the tag) added by the remote media multiplexor is stripped from the packet and examined at processing block 1120. Optionally, at processing block 1130, if control and data packets are being multiplexed onto the reservation protocol session, a determination is made whether the packet is a media packet or a control packet based upon the tag. Encrypted media packets are decrypted at processing block 1135 using the appropriate form of decryption for the associated application session. At processing block 1140, the appropriate local application(s)/endpoint(s) to which the packet is destined is/are determined. As described above, the media multiplexor 350 may perform address translation from a source network address to a destination network address. In this case, the appropriate local application(s)/endpoint(s) that are to receive the packet is/are determined by examining the address portion of the tag. Alternatively, if the media multiplexor 350 leaves the source network address in the address portion of the tag, then the appropriate local application(s)/endpoint(s) is/are determined by first translating the address portion using a local lookup table, for example.

In any event, finally, at processing block 1150, the packet is transmitted to those of the local application(s)/endpoint(s) identified in processing block 1140. If, according to the particular transport and/or control protocols employed, the application(s)/endpoint(s) receive media packets and control packets on different channels/ports, then the packet is forwarded onto the appropriate channel/port of the local application(s)/endpoints(s) based on the packet classification performed at processing block 1130.

Figure 12:
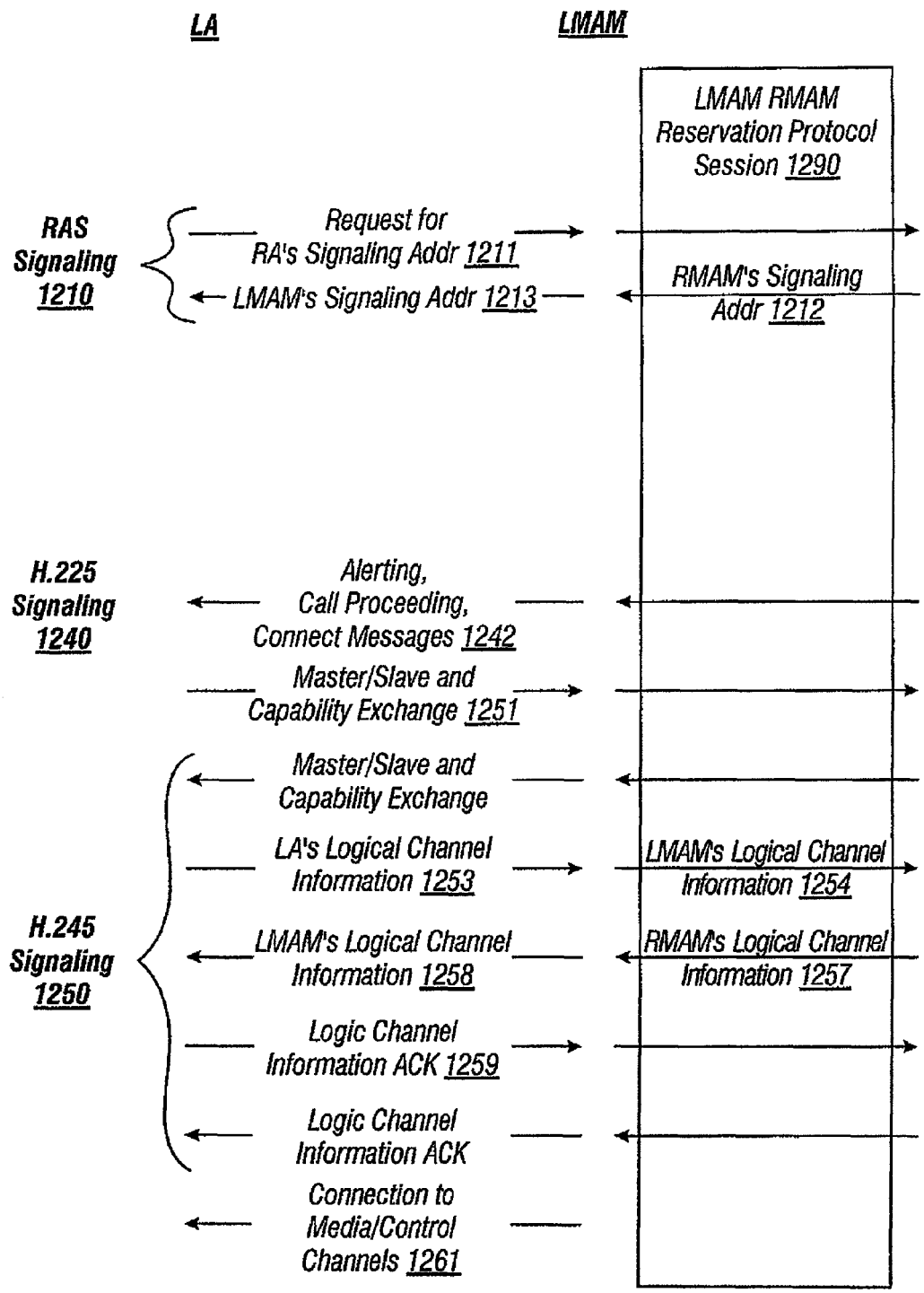
FIG. 12 conceptually illustrates application session establishment in an H.323 environment according to one embodiment of the present invention.
Figure 12:
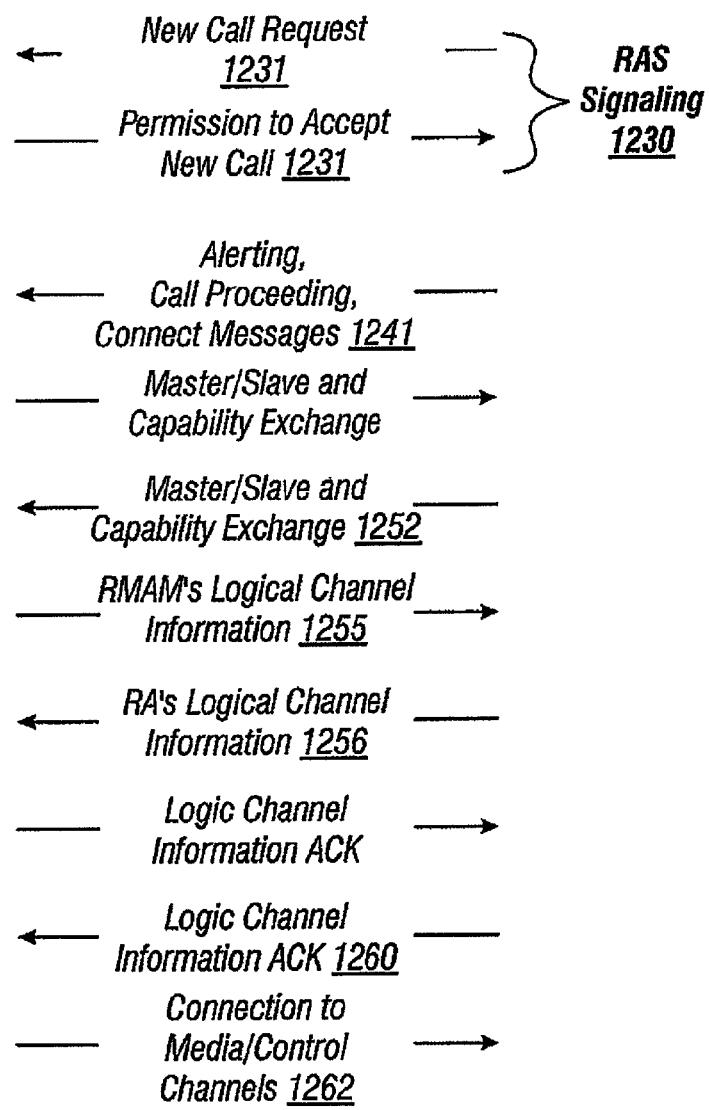

FIG. 12 conceptually illustrates application session establishment in an H.323 environment according to one embodiment of the present invention. In general, the media aggregation managers may abstract the true application session endpoints from each other and serve as proxies for their respective local applications/endpoints. As explained above, the media aggregation managers accomplish this by intercepting signaling messages originating from their respective local applications/endpoints and modifying the signaling messages to make themselves appear as the actual callers/recipients.

In this illustration, for simplicity, it is assumed that a single local application/endpoint (LA) is establishing an application session with a single remote application/endpoint (RA) over a pre-allocated reservation protocol session 1290 between a local media aggregation manager (LMAM) geographically proximate to the LA and a remote media aggregation manager (RMAM) geographically proximate to the RA.

According to this example, application session establishment involves RAS signaling 1210 and 1230, H.225 signaling 1240, and H.245 signaling 1250. RAS signaling 1210 begins with a request for the RA signaling address 1211 by the LA to the LMAM. The LMAM transmits the request 1211 via the reservation protocol session 1290 to the RMAM. In response to the request 1211, the RMAM decides it wants to route H.225/H.245 signaling through it instead of letting the RA do it directly. Therefore, the RMAM replies with a packet 1212 containing RMAM's signaling address. Similarly, the LMAM decides it wants to route H.225/H.245 signaling through it instead of letting the LA do it directly. Therefore, the LMAM substitutes its signaling address for that of the RMAM and forwards packet 1213 to the LA.

RAS signaling continues with the RA asking the RMAM (on its RAS channel) if it is okay to accept a new call by sending the RMAM a new call request 1231. The RMAM authorizes the new call by responding with a packet 1231 giving the RA permission to accept the new call.

H.225 signaling comprises the RA sending H.225 alerting/call proceeding/connect messages 1241 to the RMAM. The RMAM sends the same to the LMAM; and the LMAM sends the same to the LA. At this point, the LA determines that H.225 call signaling is complete and starts H.245 signaling.

H.245 signaling begins with the LA sending master/slave and capability exchange messages 1251 to the LMAM, which are relayed to the RMAM and from the RMAM to the RA. Then, the RA sends master/slave and capability exchange messages 1252 to the RMAM. The RMAM transmits these messages to the LMAM; and the LMAM forwards them to the LA.

Subsequently, the LA initiates an exchange of logical channel information by sending logical channel information packets 1253 to the LMAM. The logical channel information identifies the network address (e.g., IP address) and port numbers where RTP/RTCP connections will be accepted. The LMAM stores the LA's logical channel information and passes its own connection information 1254 to the RMAM. Additionally, the LMAM provides the network address of the LA to the RMAM for later use in address translation lookups. As mentioned above, the network address of the LA may be used by the RMM or the RMDX depending upon where the address translation lookup is performed. The RMAM remembers the information provided by the LMAM and generates its own RTP/RTCP information 1255 and passes it to the RA.

After receiving logical channel information thought to be associated with the LA, the RA sends its logical channel information 1256 to the RMAM (thinking it is being directed to the LA). The RMAM stores the RA's logical channel information and passes its own connection information 1257 to the LMAM. Additionally, the RMAM provides the network address of the RA to the LMAM. The LMAM remembers the logical channel information provided by the RMAM and generates its own RTP/RTCP information 1258 and passes it to the LA.

The LA sends an ACK message 1259 to the LMAM to acknowledge receipt of what it thinks to be the RA's logical channel information. The acknowledgement is relayed to the RA by the LMAM and the RMAM. The RA also sends an ACK message 1260 to the RMAM to acknowledge receipt of what it thinks to be the LA's logical channel information. The acknowledgement is related to the LA by the RMAM and the LMAM. Finally, the LMAM and the RMAM each use the logical channel information intercepted from the LA and the RA, respectively, to connect to the media and/or control channels of the LA and RA.

Exemplary Bridging Between Potentially Heterogeneous IP Telephony Environments

Figure 13:
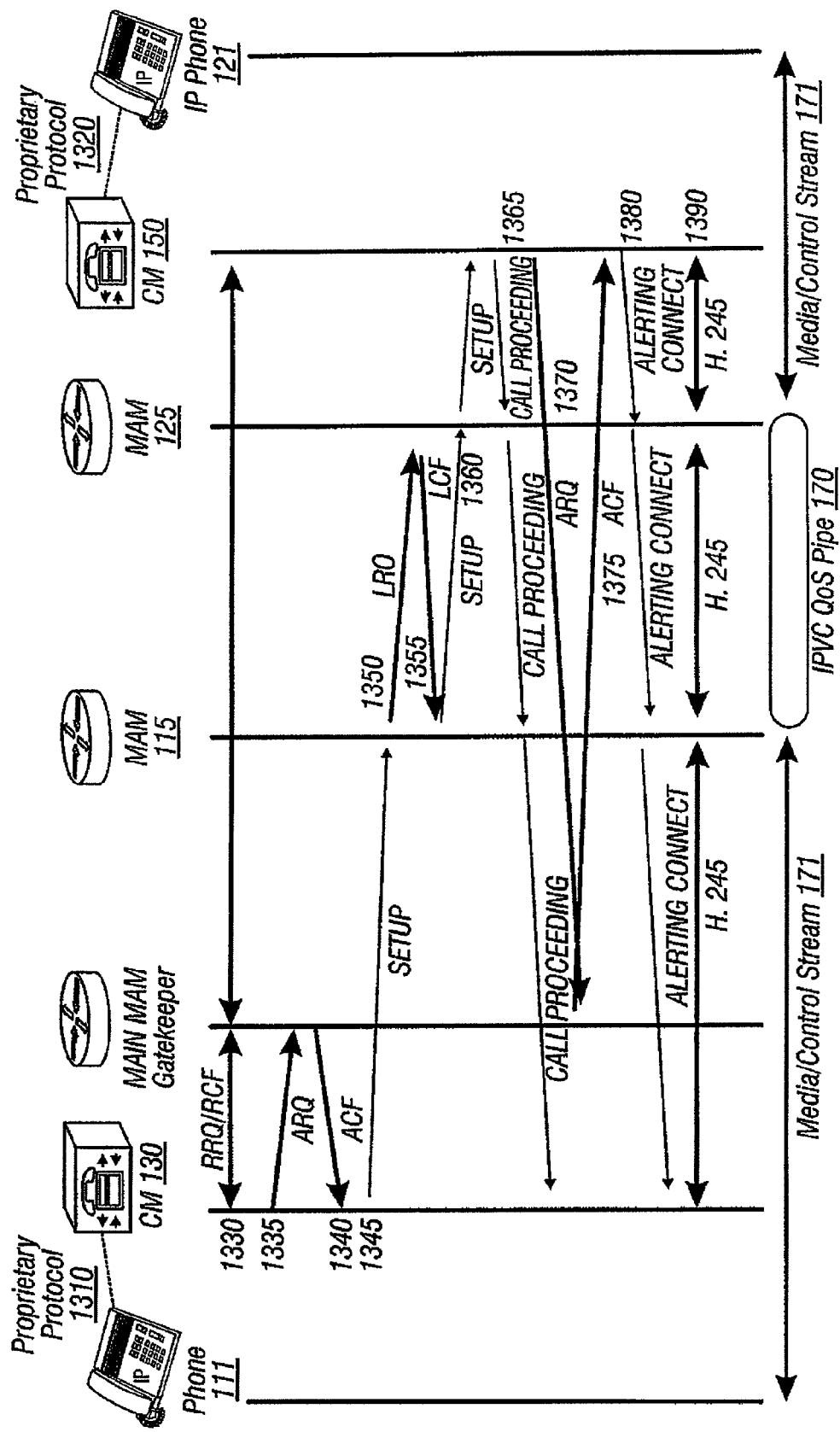
FIG. 13 conceptually illustrates H.323 signaling and media flow according to an embodiment in which call management is performed external to the media aggregation managers.

FIG. 13 conceptually illustrates H.323 signaling and media flow according to an embodiment in which call management is performed external to the media aggregation managers. Various embodiments described earlier were discussed as if call management signaling was performed by the media aggregation manager 300. According to the example illustrated by FIG. 13, call management software running on or interacting with one or more IP PBXs performs call management signaling and the media aggregation manger 300 performs signaling gateway and media gateway functionality and acts as an H.323 gateway for the IP PBX(s).

As mentioned earlier, vendors of hardware and software for IP telephony products typically employ proprietary signaling protocols (e.g., 1310 and 1320) thereby requiring customers to implement homogeneous VoIP environments. According to embodiments of the present invention, however, customers are provided with the flexibility to implement heterogeneous VoIP environments because the media aggregation manger 300 translates among various proprietary vendor signaling protocols thereby allowing IP PBX systems and IP phone sets from different vendors to interoperate.

In this signaling and media flow example, external H.323 signaling is performed by the IP PBX call management agent (e.g., CM 130 and CM 150) on behalf of the phone endpoints. At 1330, the call management agents 130 and 150 register with the main media aggregation manager gatekeeper. At 1335, IP phone 111 initiates a call to IP phone 121 by sending a setup message to the CM 130. In response, the CM 130 sends an admission request (ARQ) message to the main media aggregation manager which confirms the admission (ACF), 1340. The main media aggregation manager knows that media aggregation manager 115 is the local media aggregation manager for IP phone 111 and returns the address of media aggregation manager 115 in the ACF response message to the CM 130. The CM 130 now knows to send future signaling messages to media aggregation manager 115.

At 1345, the CM 130 sends the setup message to the media aggregation manager 115. In response, at 1350, the media aggregation manager 115 issues a location request message (LRQ) to resolve the media aggregation manager for the destination IP phone 121. Media aggregation manager 125 is the local owner for IP phone 121 and at 1355 it sends the location confirm (LCF) to media aggregation manager 115.

At 1360, media aggregation manager 115 sends the setup message to media aggregation manager 125 and media aggregation manager 125 forwards the setup message to CM 150 (Note: a media aggregation manager knows its associated call management agent via configuration).

At 1365, CM 150 notifies IP phone 121 of the call and sends the call proceeding message to media aggregation manager 125. CM 150 sends an admission request message (ARQ) for IP phone 121 to the main media aggregation manager, 1370, and the main media aggregation manger confirms the admission (ACF), at 1375.

At 1380, the alerting/connect messaging proceeds as usual and at 1390 H.245 open logical channel messaging takes place to pen the media and signaling channels between IP phone 111 and IP phone 121. In the open logical channel acknowledgement messages, the media aggregation managers replace the IP phone's RTP/RTCP IP port pair with its own local addresses which force media to be sent to the media aggregation managers and not directly to the destination phone endpoint. Thereafter, the media aggregation managers 115 and 125 ensure media packets associated with the media/control stream 171 are forwarded over the predefined IPVC QoS pipe 170.

Exemplary Encapsulated Packet Formats

Figure 14A:
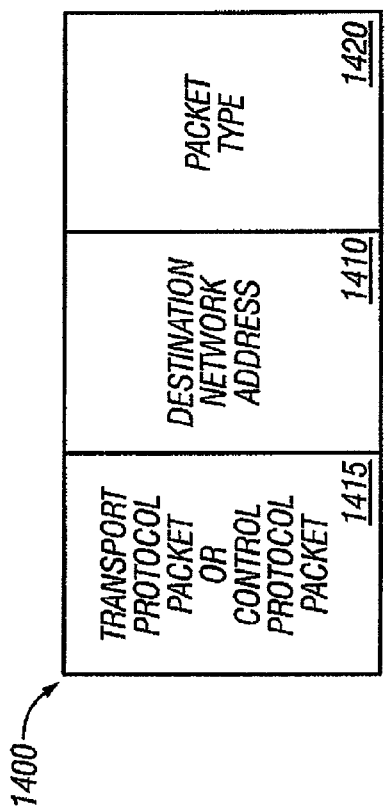
FIG. 14A illustrates the encapsulated ("MUX") packet format according to one embodiment of the present invention in which address replacement is performed by the LMAM.

FIG. 14A illustrates the encapsulated ("MUX") packet format 1400 according to one embodiment of the present invention in which address replacement is performed by the LMAM. The payload of the encapsulated packet 1400 includes a destination network address field 1410, a variable length transport or control protocol packet portion 1415, and a packet type indication 1420. The destination network address 1410 is typically the IP address of the true recipient (e.g., the application/endpoint to which the packet is destined). In environments where multiplexing of control and data is employed, the variable length portion 1415 may include either a transport protocol packet (e.g., a RTP packet) or a control protocol packet, (e.g., a RTCP packet) as indicated by the packet type indication 1420. In alternative embodiments, where multiplexing of control and data is not employed, then the variable length portion 1415 would still include either control or data, but the packet type indication 1420 would no longer be necessary.

Figure 14B:
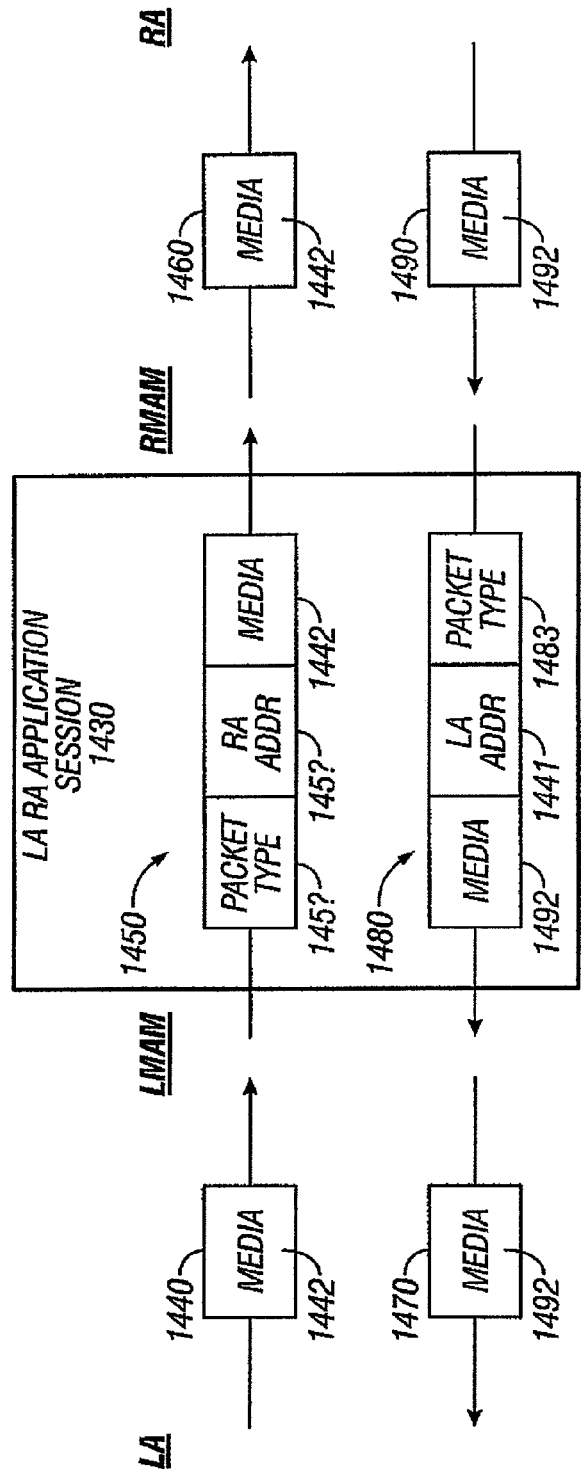
FIG. 14B illustrates media transmission in both directions according to the encapsulated packet format of FIG. 14A.

FIG. 14B illustrates media transmission in both directions according to the encapsulated packet format of FIG. 14A. When the LA originates a media packet, it generates a packet 1440 including media 1442. The LMAM optionally encrypts the media 1442 and encapsulates the media 1442 in the encapsulated packet format 1400 by generating an encapsulated packet 1450 that includes the RA's network address 1451, the media 1442, and a packet type indicator 1453. For example, upon receipt of packet 1440, the LMAM may append the network address of the RA and a packet type indicator 1453 based upon the channel/port upon which the packet 1440 was received. When the encapsulated packet 1450 is received by the RMAM, it strips the information added by the LAM, decrypts the media 1442, if necessary, and forwards a packet 1460 comprising the media 1442 to the RA.

When the RA originates a media packet, it generates a packet 1490 including media 1492. The RMAM optionally encrypts the media 1492 and encapsulates the media 1492 in the encapsulated packet format 1400 by generating an encapsulated packet 1480 that includes the LA's network address 1441, the media 1492, and a packet type indicator 1483. For example, upon receipt of packet 1490, the RMAM may append the network address of the LA and a packet type indicator 1483 based upon the channel/port upon which the packet 1490 was received. When the encapsulated packet 1480 is received by the LMAM, it strips the information added by the RMAM, decrypts the media 1492, if necessary, and forwards a packet 1470 comprising the media 1492 to the LA.

Figure 15A:
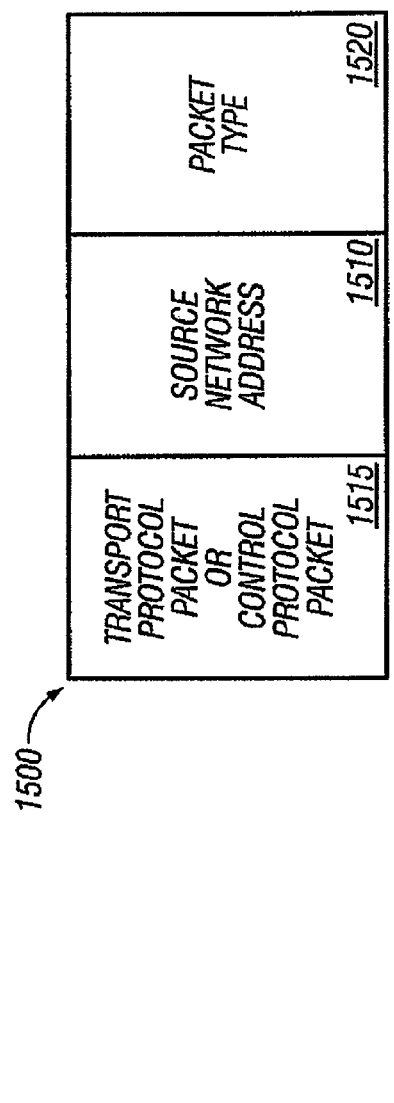
FIG. 15A illustrates the encapsulated ("MUX") packet format according to another embodiment of the present invention in which address replacement is performed by the RMAM.

FIG. 15A illustrates the encapsulated ("MUX") packet format according to another embodiment of the present invention in which address replacement is performed by the RMAM. The payload of the encapsulated packet 1500 includes a source network address field 1510, a variable length transport or control protocol packet portion 1515, and a packet type indication 1520. The source network address 1510 is typically the IP address of the true caller (e.g., the application/endpoint from which the packet is originated). In environments where multiplexing of control and data is employed, the variable length portion 1515 may include either a transport protocol packet (e.g., a RTP packet) or a control protocol packet (e.g., a RTCP packet) as indicated by the packet type indication 1520. In alternative embodiments, where multiplexing of control and data is not employed, then the variable length portion 1515 would still include either control or data, but the packet type indication 1520 would no longer be necessary.

Figure 15B:
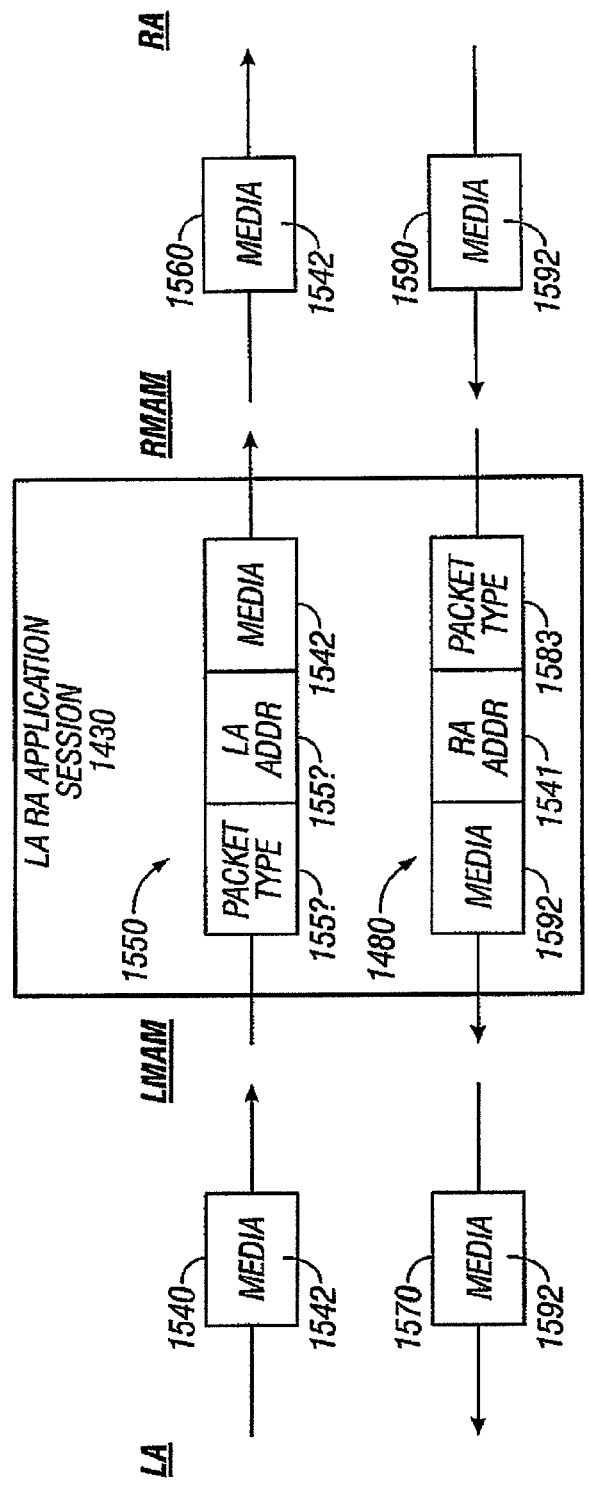
FIG. 15B illustrates media transmission in both directions according to the encapsulated packet format of FIG. 15A.

FIG. 15B illustrates media transmission in both directions according to the encapsulated packet format of FIG. 15A. When the LA originates a media packet, it generates a packet 1540 including media 1542. The LMAM optionally encrypts the media 1542 and encapsulates the media 1542 in the encapsulated packet format 1500 by generating an encapsulated packet 1550 that includes the LA's network address 1541, the media 1542, and a packet type indicator 1553. For example, upon receipt of packet 1540, the LMAM may append the network address of the LA and a packet type indicator 1553 based upon the channel/port upon which the packet 1540 was received. When the encapsulated packet 1550 is received by the RMAM, it strips the information added by the LMAM, decrypts the media 1542, if necessary, and forwards a packet 1560 comprising the media 1542 to the RA by looking up the network address of the RA based upon the LA's network address 1541.

When the RA originates a media packet, it generates a packet 1590 including media 1592. The RMAM optionally encrypts the media 1592 and encapsulates the media 1592 in the encapsulated packet format 1500 by generating an encapsulated packet 1580 that includes the RA's network address 1551, the media 1592, and a packet type indicator 1583. For example, upon receipt of packet 1580, the RMAM may append the network address of the RA and a packet type indicator 1583 based upon the channel/port upon which the packet 1580 was received. When the encapsulated packet 1580 is received by the LMAM, it strips the information added by the RMAM, decrypts the media 1592, if necessary, and forwards a packet 1570 comprising the media 1592 to the RA by looking up the network address of the LA based upon the RA's network address 1551.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. An apparatus comprising:
a network aggregation device configured to:
    couple to a plurality of communication devices and to a network having a plurality of paths;
    make a request for a first bandwidth pool for a communication session over a first path of the plurality of paths;
    determine, based on the request, the first path and additional bandwidth that is sufficient to meet a condition indicated in the request, the additional bandwidth being allocated from the first bandwidth pool to the first path; and
    perform local call admission control by allocating portions of the first bandwidth pool to at least one Internet telephony session established over the first path in response to an Internet telephony request.

2. The apparatus of claim 1, wherein the network comprises a Differentiated Services (DiffServ) network.

3. The apparatus of claim 1, wherein the additional bandwidth being allocated from the first bandwidth pool comprises part of an available bandwidth calculated based on an estimated current usage of network resources by active communication sessions.

4. The apparatus of claim 1, wherein the first network aggregation device is further configured to request a second additional amount of bandwidth over the first path in response to an insufficient amount of network resources available in the first bandwidth pool.

5. The apparatus of claim 4, wherein the network aggregation device is further configured to:
    receive an allocation of the second additional amount of bandwidth;
    append the allocation to the first bandwidth pool to form a second bandwidth pool; and
    allocate a portion of the second bandwidth pool to a second communication session.

6. The apparatus of claim 1, wherein the network aggregation device is further configured to:
    multiplex respective media streams for a plurality of communication sessions into a multiplexed media stream; and
    transmit the multiplexed media stream over the first path.

7. The apparatus of claim 1, wherein the first bandwidth pool comprises a real-time bandwidth pool associated with network resources in the first path.

8. A method comprising:
    requesting a first bandwidth pool for a communication session over a first path of the plurality of paths;
    determining, based on the request, the first path and additional bandwidth that is sufficient to meet a condition indicated in the request, the additional bandwidth being allocated from the first bandwidth pool to the first path;
    performing local call admission control by allocating portions of the first bandwidth pool to at least one Internet telephony session established over the first path in response to an Internet telephony request.

9. The method of claim 8, wherein at least one of parameters in the request is based on an estimated current usage of network resources by active communication sessions.

10. The method of claim 8, further comprising:
    requesting a second additional amount of bandwidth over the first path in response to an insufficient amount of network resources available in the first bandwidth pool.

11. The method of claim 10, further comprising:
    receiving an allocation of the second additional amount of bandwidth, wherein the second additional amount of bandwidth is appended to the first bandwidth pool to form a second bandwidth pool; and
    allocating a portion of the second bandwidth pool to a second communication session.

12. The method of claim 8, further comprising:
    multiplexing respective media streams for a plurality of communication sessions into a multiplexed media stream; and
    transmitting the multiplexed media stream over the first path.

13. A non-transitory computer readable storage medium having stored thereon instructions, execution of which, by a network device, cause the network device to perform operations comprising:
    requesting a first bandwidth pool for a communication session over a first path of the plurality of paths;
    determining, based on the request, the first path and additional bandwidth that is sufficient to meet a condition indicated in the request, the additional bandwidth being allocated from the first bandwidth pool to the first path;
    performing local call admission control by allocating portions of the first bandwidth pool to at least one Internet telephony session established over the first path in response to an Internet telephony request.

14. The non-transitory computer readable storage medium of claim 13, wherein at least one of parameters in the request is based on an estimated current usage of network resources by active communication sessions.

15. The non-transitory computer readable storage medium of claim 13, further comprising:
   requesting a second additional amount of bandwidth over the first path in response to an insufficient amount of network resources available in the first bandwidth pool.

16. The non-transitory computer readable storage medium of claim 15, further comprising:
   receiving an allocation of the second additional amount of bandwidth, wherein the second additional amount of bandwidth is appended to the first bandwidth pool to form a second bandwidth pool; and
   allocating a portion of the second bandwidth pool to a second communication session.

17. The non-transitory computer readable storage medium of claim 13, further comprising:
   multiplexing respective media streams for a plurality of communication sessions into a multiplexed media stream; and
   transmitting the multiplexed media stream over the first path.

\* \* \* \* \*